US012711909B2

(12) United States Patent
Kim et al.

(10) Patent No.: US 12,711,909 B2
(45) Date of Patent: Aug. 18, 2026

(54) DISPLAY DEVICE AND ELECTRONIC DEVICE INCLUDING THE SAME

(71) Applicant: Samsung Display Co., Ltd., Yongin-Si (KR)

(72) Inventors: Daehyun Kim, Yongin-si (KR); Sunghwan Kim, Yongin-si (KR); Wonkyu Kwak, Yongin-si (KR); Heyjin Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/050,116

(22) Filed: Feb. 11, 2025

(65) Prior Publication Data

US 2025/0356796 A1 Nov. 20, 2025

(30) Foreign Application Priority Data

May 16, 2024 (KR) ........................ 10-2024-0063588

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01)

(58) Field of Classification Search
CPC ............. G09G 3/32; G09G 2300/0426; G09G 2300/0819; G09G 3/3233
See application file for complete search history.

(56) References Cited

U.S. PATENT DOCUMENTS

| | | | | |
|---|---|---|---|---|
| 9,685,131 | B2 * | 6/2017 | Tanaka | G02F 1/1345 |
| 11,177,337 | B2 * | 11/2021 | Seo | G09G 3/3225 |
| 11,751,448 | B2 | 9/2023 | Yoon et al. | |
| 11,800,764 | B2 | 10/2023 | Cho et al. | |
| 11,854,485 | B2 * | 12/2023 | Lee | G09G 3/3258 |
| 2016/0055794 | A1 * | 2/2016 | Lee | G09G 3/3258 345/212 |
| 2019/0051670 | A1 * | 2/2019 | Bei | H10D 86/60 |
| 2023/0247870 | A1 | 8/2023 | Cho et al. | |

FOREIGN PATENT DOCUMENTS

| | | | |
|---|---|---|---|
| KR | 10-2021-0105462 | A | 8/2021 |
| KR | 10-2021-0154301 | A | 12/2021 |
| KR | 10-2023-0111640 | A | 7/2023 |
| KR | 10-2023-0117002 | A | 8/2023 |

* cited by examiner

*Primary Examiner* — Andrew Sasinowski
(74) *Attorney, Agent, or Firm* — Innovation Counsel LLP

(57) ABSTRACT

A display device comprises sub-pixel circuits arranged in a first direction and a second direction, a horizontal panel constant voltage line extending in the first direction and transmitting a panel constant voltage to the sub-pixel circuits, a vertical panel constant voltage line disposed on the horizontal panel constant voltage line, extending in the second direction, and transmitting the panel constant voltage to the horizontal panel constant voltage line, and a vertical bypass data line disposed on a same layer as the vertical panel constant voltage line, extending in the second direction, and transmitting a data voltage to the sub-pixel circuits.

19 Claims, 20 Drawing Sheets

DISPLAY DEVICE AND ELECTRONIC DEVICE INCLUDING THE SAME

This application claims priority to Korean Patent Application No. 10-2024-0063588, filed on May 16, 2024, and all the benefits accruing therefrom under 35 U.S.C. § 119, the content of which in its entirety is herein incorporated by reference.

BACKGROUND

1. Field

Embodiments of the present disclosure related to a display device.

2. Description of the Related Art

A display device includes sub-pixel circuits and light emitting diodes. The sub-pixel circuits are arranged side by side on a substrate, and signals and voltages are provided to the sub-pixel circuits. The sub-pixel circuits generate driving current based on the signals and voltages, and the light emitting diodes generate light based on the driving current.

Examples of the signals and voltages provided to the sub-pixel circuits may include a gate signal, a data voltage, and a panel constant voltage. The panel constant voltage refers to a constant voltage (e.g., a high power voltage, a gate initialization voltage, an anode initialization voltage, etc.) provided to the sub-pixel circuits, and it is necessary to provide a constant level of voltage to all of the sub-pixel circuits.

SUMMARY

Embodiments of the present disclosure provide a display device.

Embodiments of the present disclosure provide an electronic device including the display device.

A display device according to an embodiment includes sub-pixel circuits disposed on a substrate and arranged in a first direction and a second direction intersecting the first direction, a horizontal panel constant voltage line disposed on the substrate, extending in the first direction, and transmitting a panel constant voltage to the sub-pixel circuits, a vertical panel constant voltage line disposed on the horizontal panel constant voltage line, extending in the second direction, and transmitting the panel constant voltage to the horizontal panel constant voltage line, and a vertical bypass data line disposed on a same layer as the vertical panel constant voltage line, extending in the second direction, and transmitting a data voltage to the sub-pixel circuits.

In an embodiment, the vertical panel constant voltage line may be disconnected from the vertical bypass data line.

In an embodiment, the display device may further include a panel constant connecting pattern disposed between the horizontal panel constant voltage line and the vertical panel constant voltage line, and electrically connecting the horizontal panel constant voltage line and the vertical panel constant voltage line.

In an embodiment, the panel constant voltage may be transmitted sequentially along the vertical panel constant voltage line, the panel constant voltage connecting pattern, and the horizontal panel constant voltage line.

In an embodiment, the display device may further include a low power voltage connecting pattern disposed on a same layer as the panel constant voltage connecting pattern and a vertical low power voltage line disposed on a same layer as the vertical panel constant voltage line, connecting the low power voltage connecting pattern, and transmitting a low power voltage.

In an embodiment, the vertical low power voltage line may extend in the second direction and may be arranged parallel to the vertical panel constant voltage line along the first direction.

In an embodiment, the low power voltage connecting pattern and the panel constant voltage connection pattern may extend in the first direction, and may be spaced apart from each other along the first direction.

In an embodiment, the low power voltage connecting pattern may be disconnected from the panel constant voltage connecting pattern.

In an embodiment, the vertical low power voltage line may include a first vertical low power voltage line, a second vertical low power voltage line, and a third vertical low power voltage line, and the first vertical low power voltage line, the vertical panel constant voltage line, the second vertical low power voltage line, and the third vertical low power voltage line may be arranged sequentially from a first side to a second side of the display panel and may be in parallel along the first direction.

In an embodiment, the low power voltage connecting pattern may include a first low power voltage connecting pattern and a second low power voltage connecting pattern. The first low power voltage connecting pattern may be electrically connected to the first vertical low power voltage line, and the second low power voltage connecting pattern may be electrically connected to the second vertical low power voltage line and the third vertical low power voltage line.

In an embodiment, the first low power voltage connecting pattern, the panel constant voltage connecting pattern, and the second low power voltage connecting pattern may extend in the first direction and may be spaced apart from each other along the first direction.

In an embodiment, the vertical low power voltage line may further include a fourth vertical low power voltage line, a fifth vertical low power voltage line, and the sixth vertical low power voltage line, and the vertical panel constant voltage line may include a first vertical panel constant voltage line and a second vertical panel constant voltage line. The fourth vertical low power voltage line, the second vertical panel constant voltage line, the fifth vertical low power voltage line, and the sixth vertical low power voltage line may be arranged sequentially from the first side to the second side of the display device and may be in parallel along the first direction.

In an embodiment, the panel constant voltage connecting pattern may include a first panel constant voltage connecting pattern and a second panel constant voltage connecting pattern. The first panel constant voltage connecting pattern may be electrically connected to the first vertical panel constant voltage line, and the second panel constant voltage connecting pattern may be electrically connected to the second vertical panel constant voltage line.

In an embodiment, the second low power voltage connecting pattern may be further electrically connected to the fourth vertical low power voltage line, the fifth vertical low power voltage line, and the sixth vertical low power voltage line.

In an embodiment, the low power voltage connecting pattern may further include a third low power voltage connecting pattern and a fourth low power voltage connecting pattern. The third low power voltage connecting pattern may be electrically connected to the first vertical low power voltage line, the second vertical low power voltage line, the third vertical low power voltage line, and the fourth vertical low power voltage line, and the fourth low power voltage connecting pattern may be electrically connected to the fifth vertical low power voltage line and the sixth vertical low power voltage line.

In an embodiment, the third low power voltage connecting pattern, the second panel constant voltage connecting pattern, and the fourth low power voltage connecting pattern may extend in the first direction and may be spaced apart from each other along the first direction, and the first panel constant voltage connecting pattern and the second panel constant voltage connecting pattern may be spaced apart from each other in the second direction.

In an embodiment, the vertical low power voltage line may include a first vertical low power voltage line and a second vertical low power voltage line, and the vertical panel constant voltage line may include a first vertical panel constant voltage line and a second vertical panel constant voltage line. The first vertical low power voltage line, the second vertical low power voltage line, the first vertical panel constant voltage line, and the second vertical panel constant voltage line may be arranged sequentially from a first side to a second side of the display device and may be in parallel along the first direction.

In an embodiment, the low power voltage connecting pattern may include a first low power voltage connecting pattern and a second low power voltage connecting pattern The first low power voltage connecting pattern and the second low power voltage connecting pattern may be arranged in parallel along the second direction, and may be electrically connected to the first and second vertical panel constant voltage lines, and the panel constant voltage connecting pattern may be arranged spaced apart from the second low power voltage connecting pattern along the first direction, and may be electrically connected to the first and second vertical panel constant voltage lines.

In an embodiment, the vertical panel constant voltage line may include a first vertical panel constant voltage line and a second vertical panel constant voltage line. The first vertical panel constant voltage line may transmit a first panel constant voltage to a first sub-pixel circuit, the second vertical panel constant voltage line may transmit a second panel constant voltage different from the first panel constant voltage to a second sub-pixel circuit, and the panel constant voltage may be an anode initialization voltage which initializes a pixel electrode.

An electronic device according to an embodiment includes a display device and a power supply configured to provide power to the display device. The display device may include sub-pixel circuits disposed on a substrate and arranged in a first direction and a second direction intersecting the first direction, a horizontal panel constant voltage line disposed on the substrate, extending in the first direction, and transmitting a panel constant voltage to the sub-pixel circuits, a vertical panel constant voltage line disposed on the horizontal panel constant voltage line, extending in the second direction, and transmitting the panel constant voltage to the horizontal panel constant voltage line, and a vertical bypass data line disposed on a same layer as the vertical panel constant voltage line, extending in the second direction, and transmitting a data voltage to the sub-pixel circuits.

Therefore, a display device according to embodiments of the present disclosure may include a horizontal panel constant voltage line and a vertical panel constant voltage line, which are formed within a display area. The panel constant voltage may be transmitted to a sub-pixel circuit through the horizontal panel constant voltage line and the vertical panel constant voltage line that cross each other.

In other words, the horizontal panel constant voltage line and the vertical panel constant voltage line may be arranged in a mesh form within the display area. Since the panel constant voltage is transmitted through the horizontal panel constant voltage line and the vertical panel constant voltage line, a voltage drop defect of the panel constant voltage may be prevented.

In addition, the vertical panel constant voltage line and the vertical bypass data line may be formed together to be disposed on the same layer. Accordingly, a separate process for forming the vertical panel constant voltage line may be omitted.

BRIEF DESCRIPTION OF THE DRAWINGS

The above and other features of the present disclosure will be more clearly understood with reference to the following detailed description and the accompanying drawings.

DETAILED DESCRIPTION

Figure 1:
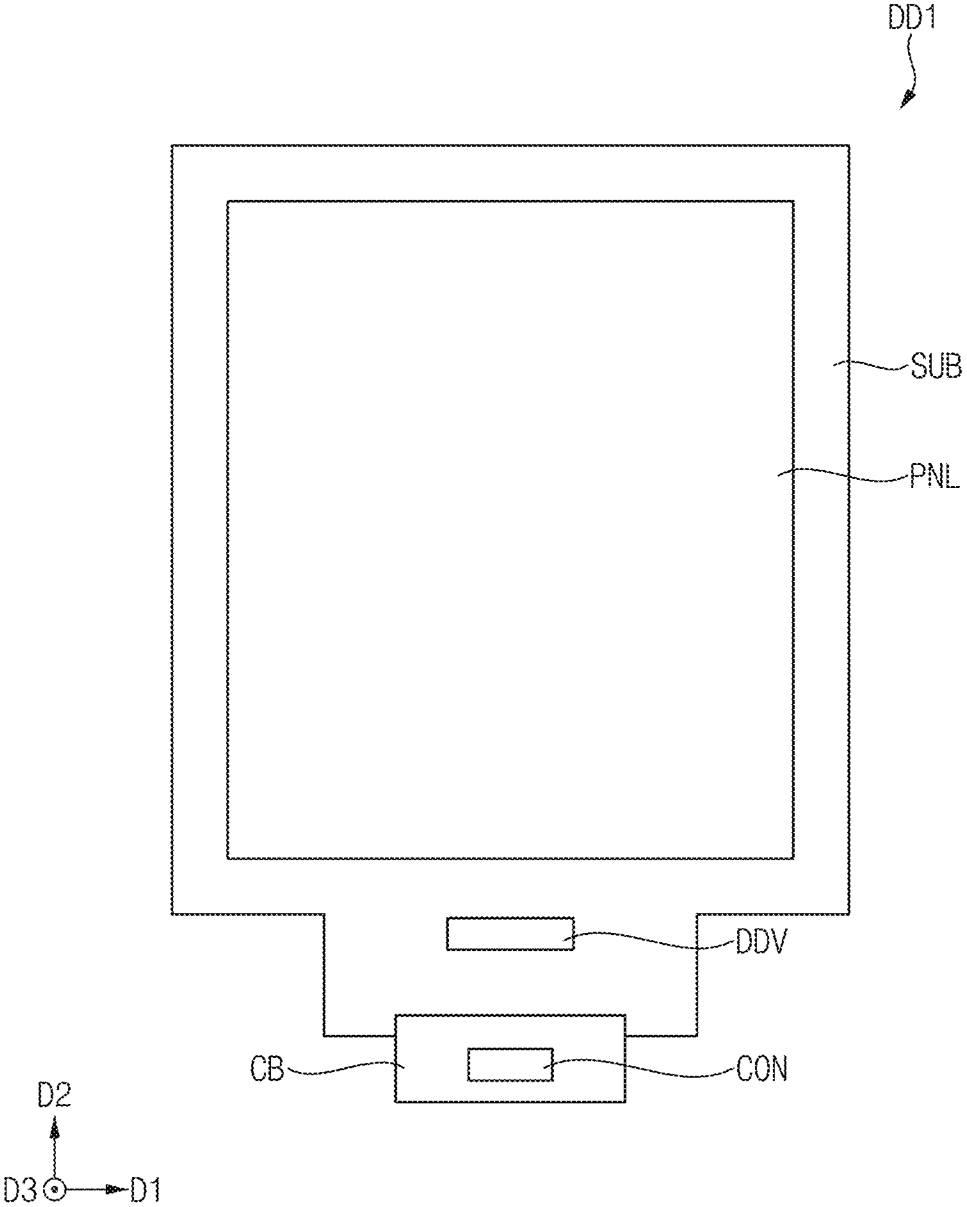
FIG. 1 is a plan view illustrating a display device according to an embodiment of the present disclosure.

Hereinafter, display devices in accordance with embodiments of the present disclosure will be described in more detail with reference to the accompanying drawings. The same reference numerals are used for the same components in the drawings, and redundant descriptions of the same components will be omitted.

Figure 2:
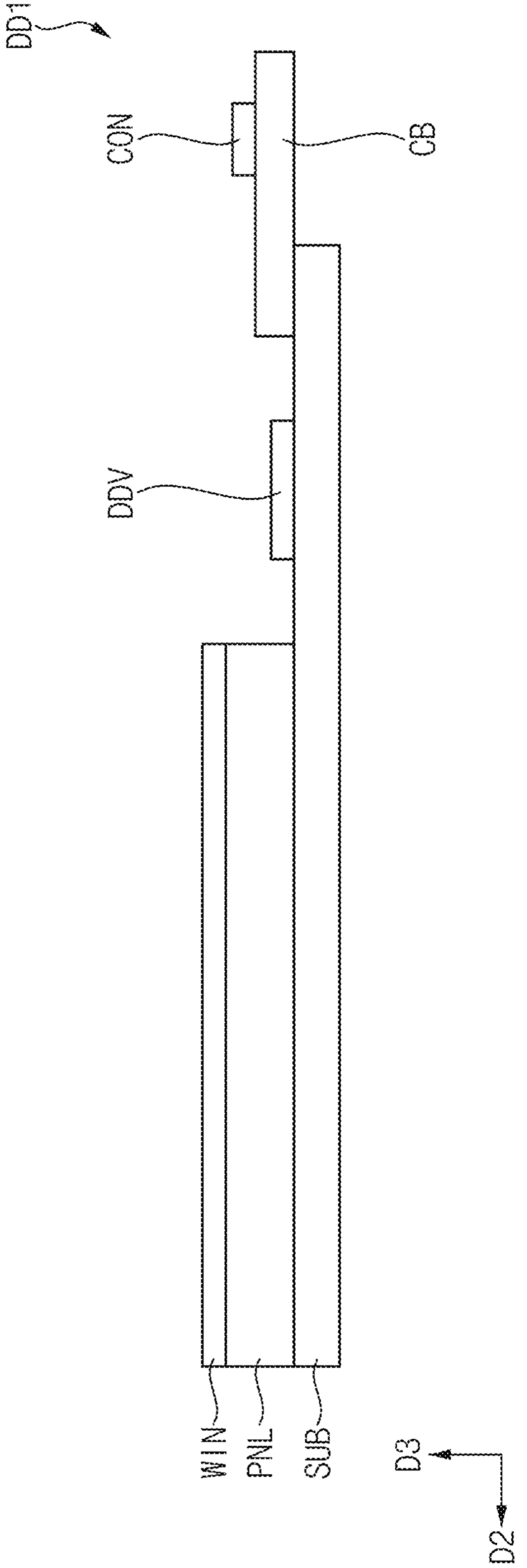
FIG. 2 is a side view illustrating the display device of FIG. 1.

FIG. 1 is a plan view illustrating a display device according to an embodiment of the present disclosure. FIG. 2 is a side view illustrating the display device of FIG. 1.

Referring to FIGS. 1 and 2, a display device DD1 according to an embodiment of the present disclosure may include a substrate SUB, a display panel PNL, a window WIN, a data driver DDV, a controller CON, and a circuit board CB.

The substrate SUB may include a transparent material or an opaque material. In an embodiment, examples of materials that may be used as the substrate SUB may include glass, quartz, plastic, etc. These may be used alone or in combination with each other.

The display panel PNL may be disposed on the substrate SUB. The display panel PNL may generate and emit light. Accordingly, the display panel PNL may display an image.

The window WIN may be disposed on the display panel PNL. The window WIN may protect the display panel PNL. In an embodiment, examples of materials that may be used as the window WIN may include glass, quartz, plastic, and the like. These can be used alone or in combination with each other.

In an embodiment, the data driver DDV may be disposed on the substrate SUB. The data driver DDV may provide a data voltage to the display panel PNL.

The controller CON may be disposed on the circuit board CB. The controller CON may be connected to the data driver DDV and/or the display panel PNL through the circuit board CB.

The circuit board CB may be disposed on the substrate SUB. The circuit board CB may connect the controller CON to the data driver DDV and/or the display panel PNL. In addition, an additional driver (e.g., a touch driver, etc.) may be disposed on the circuit board CB.

Figure 3:
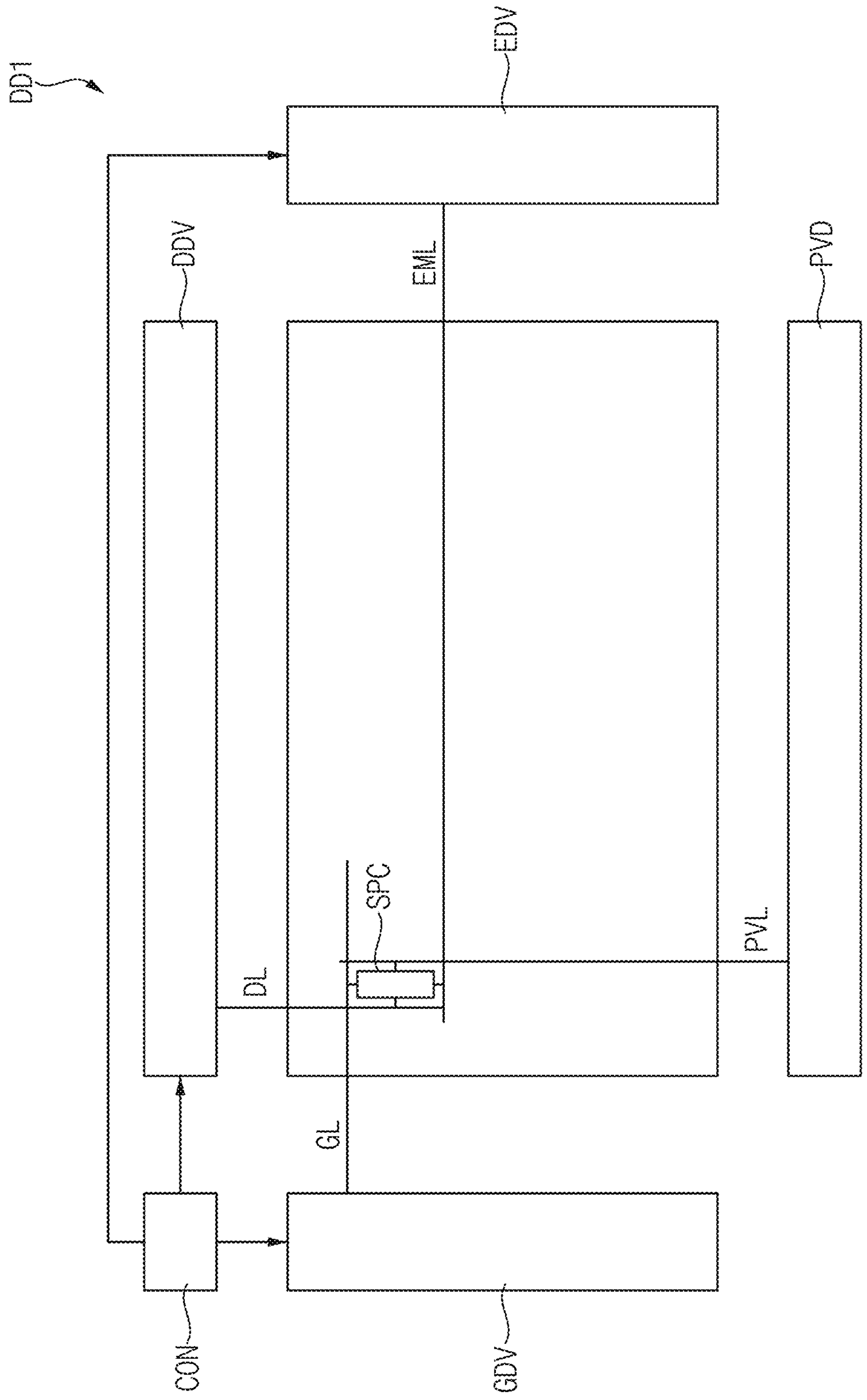
FIG. 3 is a block diagram illustrating the display device of FIG. 1.
Figure 4:
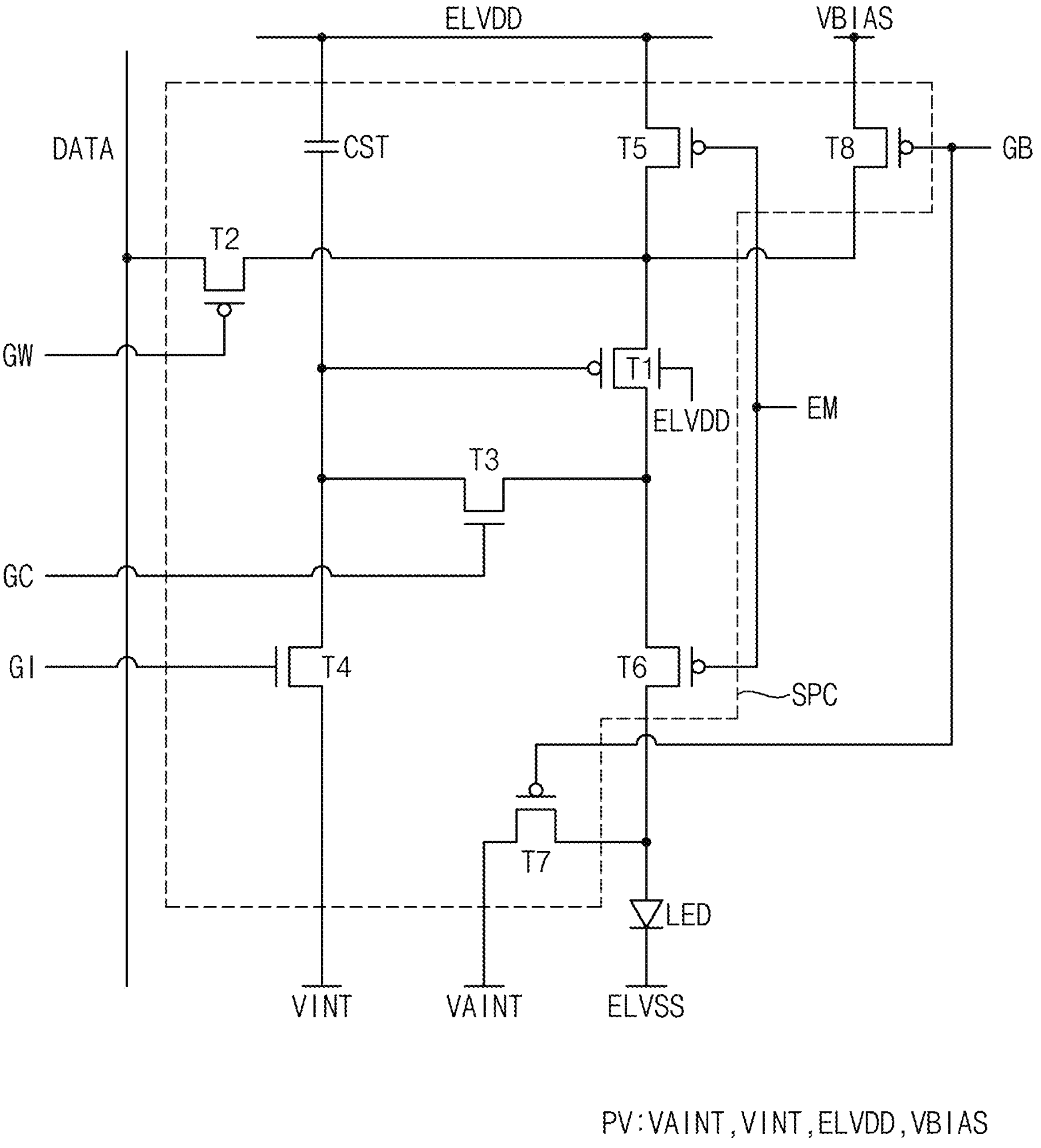
FIG. 4 is a circuit diagram illustrating a sub-pixel circuit and a light emitting diode included in the display device of FIG. 1.

FIG. 3 is a block diagram illustrating the display device of FIG. 1. FIG. 4 is a circuit diagram illustrating a sub-pixel circuit and a light emitting diode included in the display device of FIG. 1.

Referring to FIG. 3, the display device DD1 may include a gate driver GDV, an emission driver EDV, a data driver DDV, a controller CON, a panel constant voltage supply PVD, and a sub-pixel circuit SPC.

The gate driver GDV may generate a gate signal. The gate driver GDV may sequentially provide the gate signal, and the gate signal may be transmitted to the sub-pixel circuit PC through a gate line GL.

The emission driver EDV may generate an emission control signal. The emission driver EDV may sequentially provide the emission control signal, and the emission control signal may be transmitted to the sub-pixel circuit PC through an emission control line EML.

The data driver DDV may generate a data voltage. The data voltage may be transmitted to the sub-pixel circuit PC through a data line DL.

The controller CON may be connected to an external processor (e.g., GPU, etc.) and may control the gate driver GDV, the emission driver EDV, and the data driver DDV. For example, the controller CON may transmit a gate control signal to the gate driver GDV and may transmit a data control signal to the data driver DDV.

The panel constant voltage supply PVD may generate a panel constant voltage. The panel constant voltage may be transmitted to the sub-pixel circuit PC through a panel constant voltage line PVL.

In an embodiment, the panel constant voltage may be a constant voltage transmitted to the sub-pixel circuit PC. For example, the panel constant voltage may be at least one of an anode initialization voltage, a gate initialization voltage, a high power voltage, or a bias voltage.

Referring to FIG. 4, the sub-pixel circuit SPC may receive the panel constant voltage PV, the data voltage DATA, the gate signals GW, GC, GI, and GB, and the emission control signal EM, and may generate a driving current. The sub-pixel circuit SPC may be connected to a light emitting diode LED, and the driving current may be transmitted to the light emitting diode LED.

In an embodiment, the sub-pixel circuit SPC may include a first transistor T1, a second transistor T2, a third transistor T3, a fourth transistor T4, a fifth transistor T5, a sixth transistor T6, a seventh transistor T7, an eighth transistor T8, and a storage capacitor CST.

The first transistor T1 may include a first terminal, a second terminal, a gate terminal, and a back gate terminal. The first terminal may be connected to the second transistor T2. The second terminal may be connected to the third transistor T3. The gate terminal may be connected to the third transistor T3. The back gate terminal may be provided with the high power voltage ELVDD.

The first transistor T1 may generate the driving current based on the voltage difference between the first terminal and the gate terminal.

The second transistor T2 may include a first terminal, a second terminal, and a gate terminal. The first terminal may be provided with the data voltage DATA. The second terminal may be connected to the first transistor T1. The gate terminal may be provided with a first gate signal GW.

The second transistor T2 may transmit the data voltage DATA in response to the first gate signal GW.

The third transistor T3 may include a first terminal, a second terminal, and a gate terminal. The first terminal may be connected to a second terminal of the first transistor T1. The second terminal may be connected to a gate terminal of the first transistor T1. The gate terminal may be provided with a second gate signal GC.

The third transistor T3 may compensate for the threshold voltage of the first transistor T1 in response to the second gate signal GC.

The fourth transistor T4 may include a first terminal, a second terminal, and a gate terminal. The first terminal may be provided with the gate initialization voltage VINT. The second terminal may be connected to the gate terminal of the first transistor T1. The gate terminal may be provided with a third gate signal GI.

The fourth transistor T4 may initialize the gate terminal of the first transistor T1 in response to the third gate signal GI.

The fifth transistor T5 may include a first terminal, a second terminal, and a gate terminal. The first terminal may be provided with the high power voltage ELVDD. The second terminal may be connected to the first transistor T1. The gate terminal may be provided with the emission control signal EM.

The fifth transistor T5 may transmit the high power voltage ELVDD to the first transistor T1 in response to the emission control signal EM.

The sixth transistor T6 may include a first terminal, a second terminal, and a gate terminal. The first terminal may be connected to the first transistor T1. The second terminal may be connected to the light emitting diode LED. The gate terminal may be provided with the emission control signal EM.

The sixth transistor T6 may transmit the driving current to the light emitting diode LED in response to the emission control signal EM.

The seventh transistor T7 may include a first terminal, a second terminal, and a gate terminal. The first terminal may be provided with the anode initialization voltage VAINT. The second terminal may be connected to the light emitting diode LED. The gate terminal may be provided with a fourth gate signal GB.

The seventh transistor T7 may transmit the anode initialization voltage VAINT to the light emitting diode LED in response to the fourth gate signal GB.

The eighth transistor T8 may include a first terminal, a second terminal, and a gate terminal. The first terminal may be provided with the bias voltage VBIAS. The second terminal may be connected to the first transistor T1. The gate terminal may be provided with the fourth gate signal GB.

The eighth transistor T8 may transmit the bias voltage VBIAS to the first transistor T1 in response to the fourth gate signal GB.

The storage capacitor CST may include a first terminal and a second terminal. The first terminal may be connected to a high power voltage line providing the high power voltage ELVDD. The second terminal may be connected to the first transistor T1. The storage capacitor CST may store a voltage corresponding to the data voltage DATA.

In an embodiment, each of the first, second, fifth, sixth, seventh, and eighth transistors T1, T2, T5, T6, T7, and T8 may be a PMOS transistor, and each of the third and fourth transistors T3 and T4 may be an NMOS transistor. However, the present disclosure is not limited thereto.

In addition, as described above, the first to fourth gate signals GW, GC, GI, and GB, the emission control signal EM, the data voltage DATA, and the panel constant voltage PV may be provided to the sub-pixel circuit SPC. The panel constant voltage PV may mean a constant voltage provided to the sub-pixel circuit SPC, and may be, for example, at least one of the anode initialization voltage VAINT, the gate initialization voltage VINT, the high power voltage ELVDD, or the bias voltage VBIAS.

The following description will explain an embodiment where the panel constant voltage PV is the anode initialization voltage VAINT, but the present disclosure is not limited thereto.

The light emitting diode LED may include a first terminal and a second terminal. The first terminal may be connected to the sixth and seventh transistors T6 and T7. The second terminal may be provided with a low power voltage ELVSS. The first terminal of the light emitting diode LED may receive the driving current from the sixth transistor T6 and may receive the anode initialization voltage VAINT from the seventh transistor T7.

Figure 5:
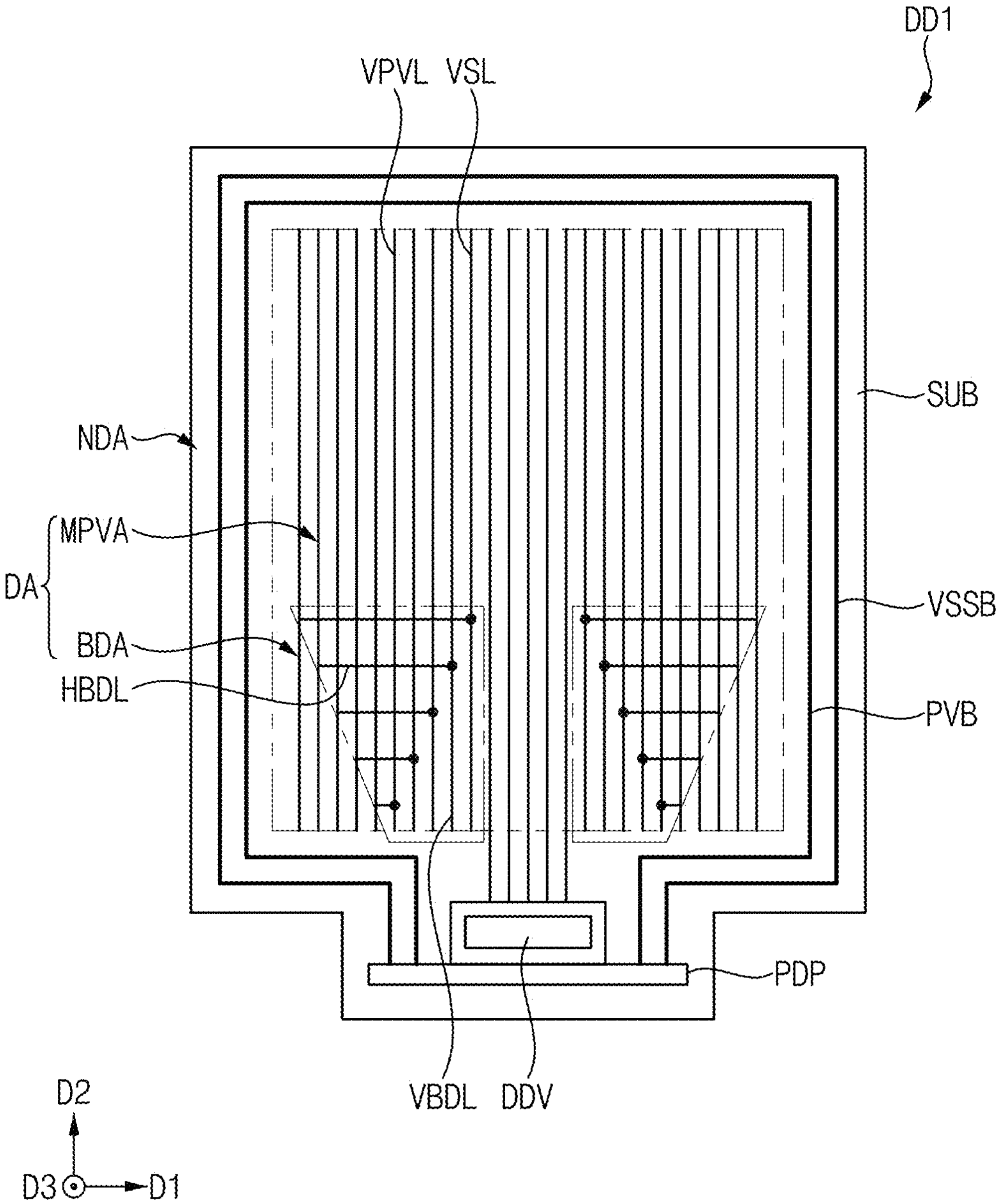
FIG. 5 is a plan view illustrating the display device of FIG. 1.
Figure 6:
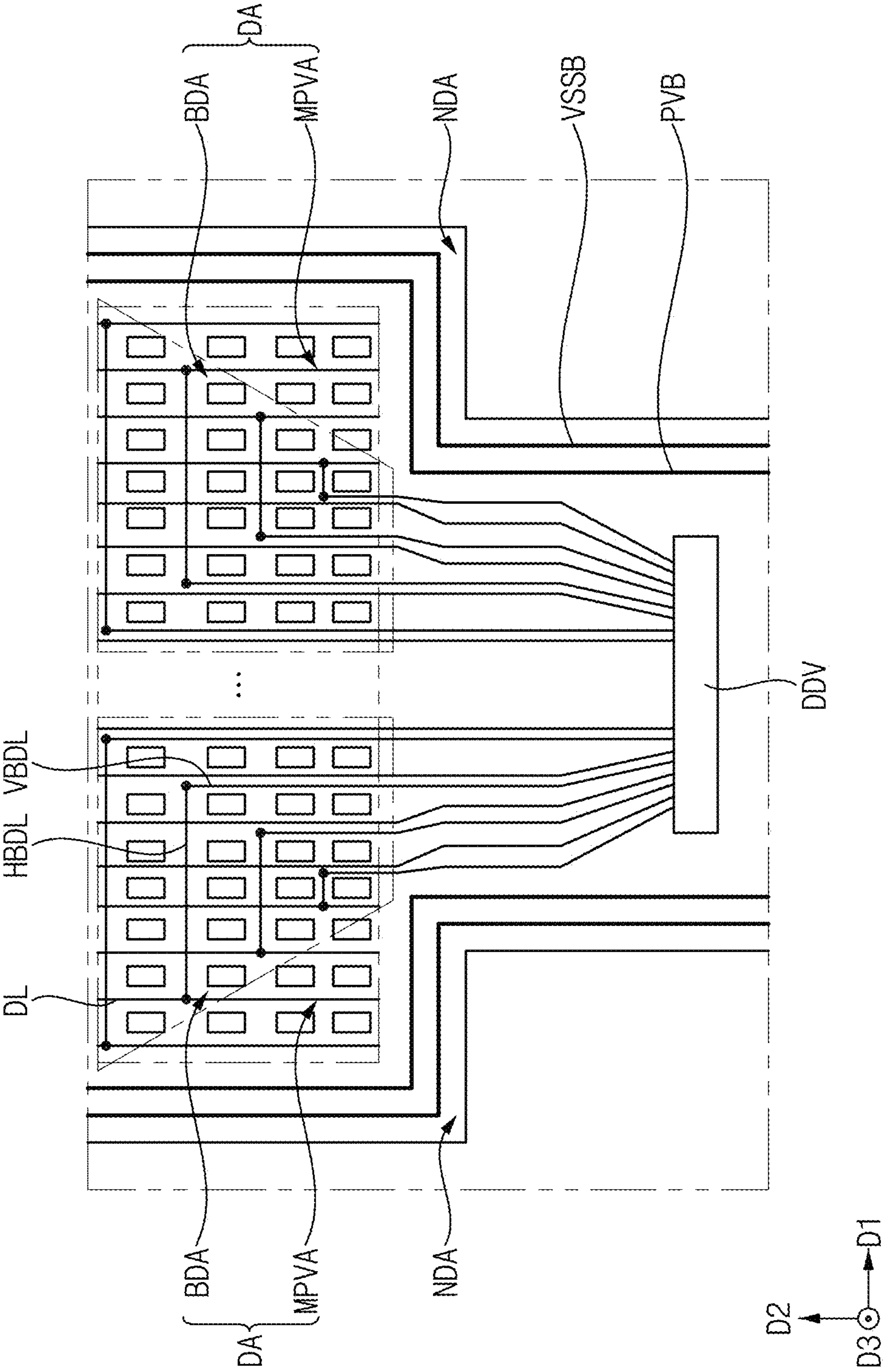
FIG. 6 is an enlarged view illustrating a bypass data voltage area included in the display device of FIG. 1.

FIG. 5 is a plan view illustrating the display device of FIG. 1. FIG. 6 is an enlarged view illustrating a bypass data voltage area included in the display device of FIG. 1.

Referring to FIG. 5, the display device DD1 may be divided into a display area DA and a non-display area NDA. The display area DA may be an area where an image is displayed and may be an area where the light emitting diode LED is arranged. The non-display area NDA may be an area surrounding at least a portion of the display area DA.

In an embodiment, at least one horizontal line extending in a first direction D1 and at least one vertical line extending in a second direction D2 intersecting the first direction D1 may be disposed on the substrate SUB.

For example, the horizontal line may include a horizontal bypass data line HBDL extending in the first direction D1. The vertical line may include a vertical bypass data line VBDL, a vertical panel voltage line VPVL, and a vertical low voltage line VSL extending in the second direction D2.

In an embodiment, the vertical bypass data line VBDL and the vertical panel voltage line VPVL may be formed together and may be disposed on the same layer. For example, the vertical bypass data line VBDL may be connected to the horizontal bypass data line HBDL through a contact hole and may transmit the data voltage DATA.

In an embodiment, the vertical panel voltage line VPVL may be disposed on the same layer as the vertical bypass data line VBDL and may be disconnected from the vertical bypass data line VBDL. For example, the vertical panel voltage line VPVL may be disconnected from the vertical bypass data line VBDL around an area where the contact hole is formed. Accordingly, the vertical panel voltage line VPVL may not be electrically connected to the vertical bypass data line VBDL and may transmit the panel voltage PV.

In addition, in an embodiment, the vertical low voltage line VSL may be disposed on the same layer as the vertical bypass data line VBDL, and may be disconnected from the vertical bypass data line VBDL. For example, the vertical low voltage line VSL may be disconnected from the vertical bypass data line VBDL around an area where the contact hole is formed. Accordingly, the vertical low voltage line VSL may not be electrically connected to the vertical bypass data line VBDL, and may transmit the low power voltage ELVSS.

In an embodiment, the display area DA may be divided into a bypass data voltage area BDA and a mesh panel voltage area MPVA.

For example, the bypass data voltage area BDA may be an area adjacent to the data driver DDV and an area where the horizontal and vertical bypass data lines HBDL and VBDL are disposed. The data voltage DATA may be transmitted in the bypass data voltage area BDA.

For example, the mesh panel voltage area MPVA may be an area excluding the bypass data voltage area BDA, and may be an area where the vertical panel constant voltage line VPVL and/or the vertical low voltage line VSL are disposed. In the mesh panel voltage area MPVA, the panel constant voltage PV and/or the low power supply voltage ELVSS may be transmitted.

In an embodiment, a panel constant voltage bus PVB, a low power voltage bus VSSB, the data driver DDV, and a pad part PDP may be arranged in the non-display area NDA. The panel constant voltage bus PVB may receive the panel constant voltage PV from the pad part PDP and may be disposed to surround the display area DA. The low power voltage bus VSSB may receive the low power voltage ELVSS from the pad part PDP and may be disposed to surround the panel constant voltage bus PVB.

Referring to FIG. 6, the vertical bypass data line VBDL may extend in the second direction D2 and may be connected between the data driver DDV and the horizontal bypass data line HBDL. The horizontal bypass data line HBDL may extend in the first direction D1 and may be connected between the vertical bypass data line VBDL and the data line DL. The data voltage DATA may be transmitted from the data driver DDV to the data line DL through the vertical bypass data line VBDL and the horizontal bypass data line HBDL.

Figure 7:
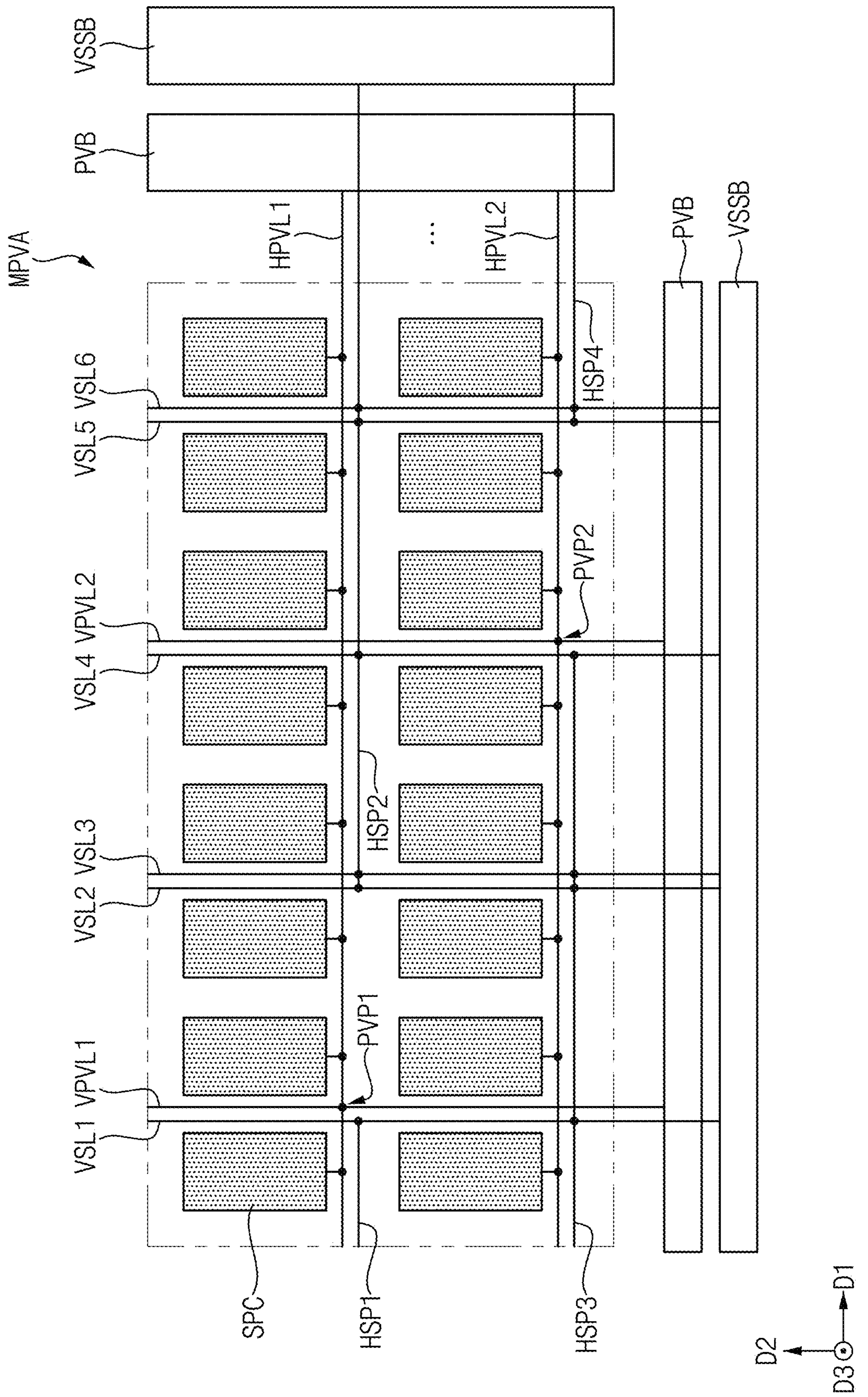
FIG. 7 is a block diagram illustrating a mesh panel voltage area included in the display device of FIG. 1.
Figure 8:
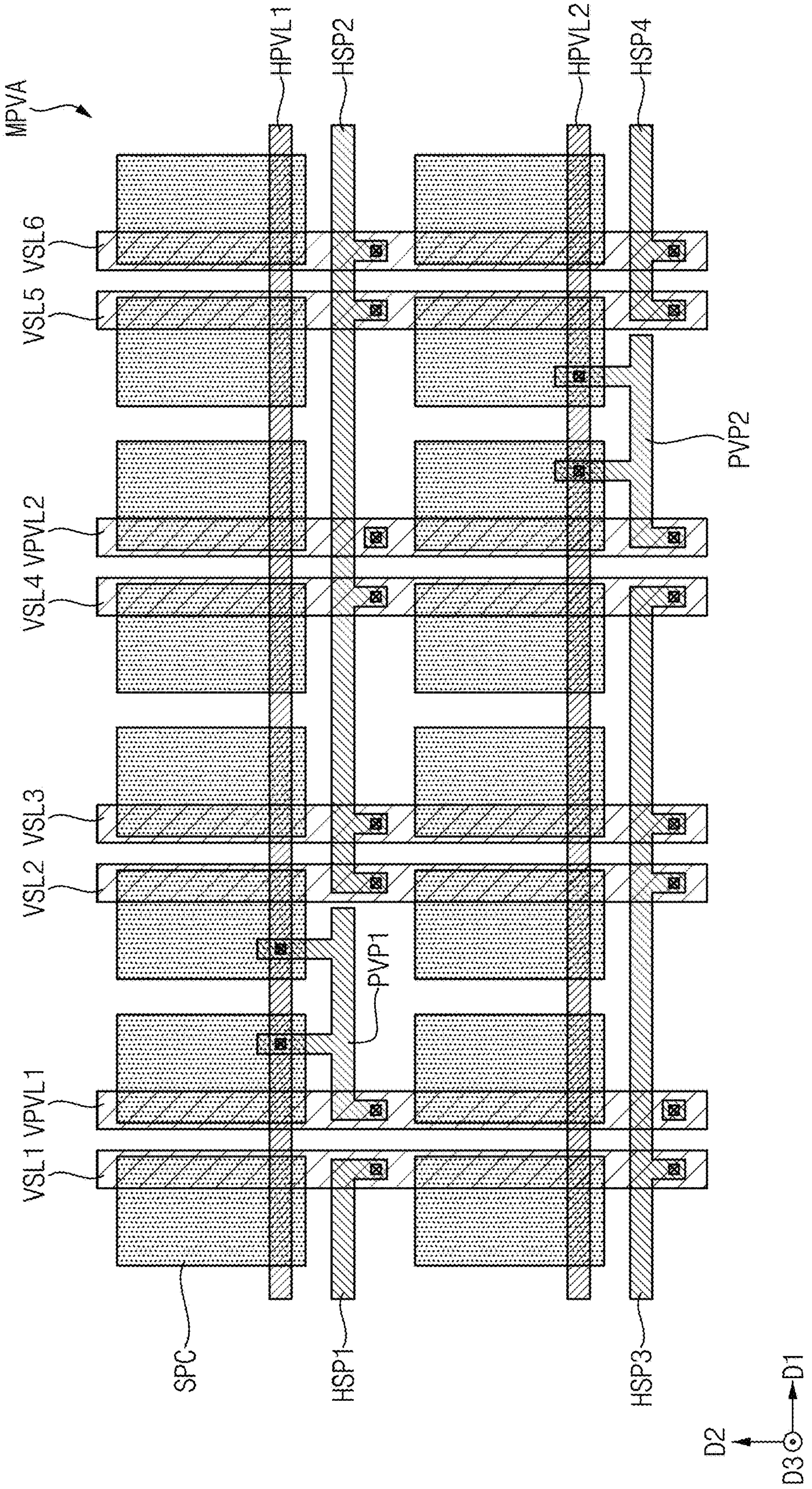
FIG. 8 is an enlarged view illustrating the mesh panel voltage area of FIG. 7.
Figure 9:
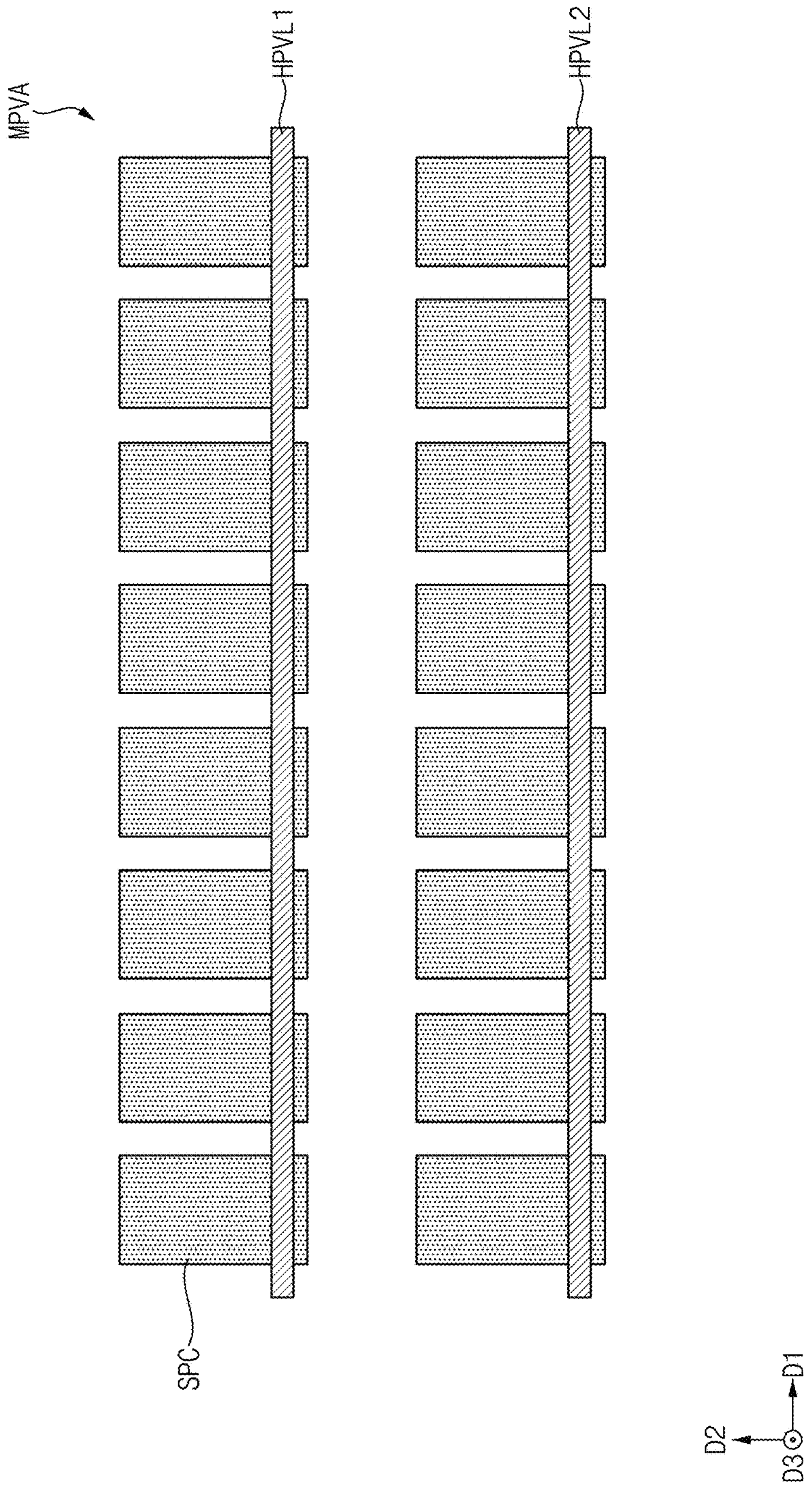
FIGS. 9 to 11 are exploded views illustrating the mesh panel voltage area of FIG. 8.
Figure 10:
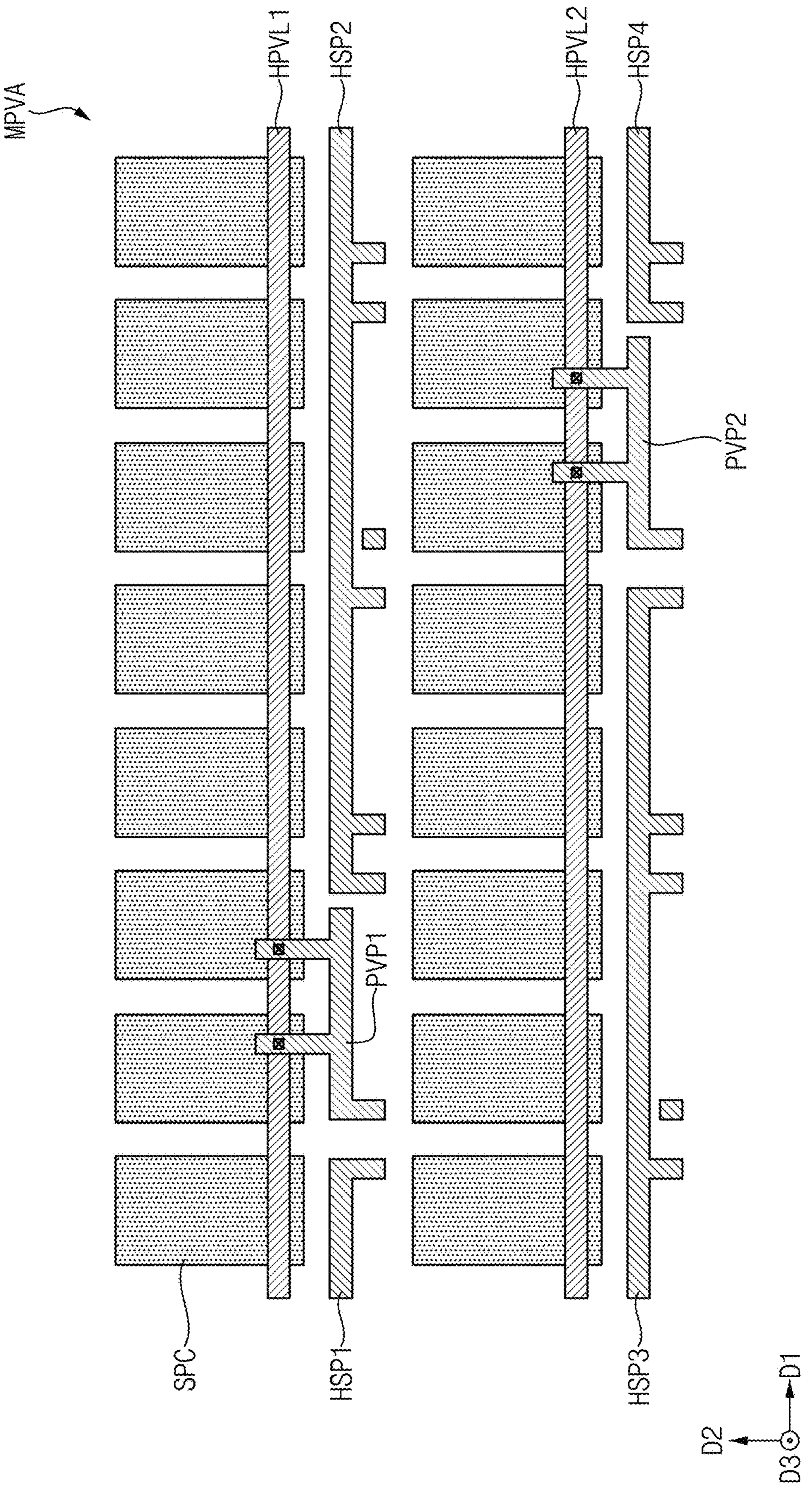
Figure 11:
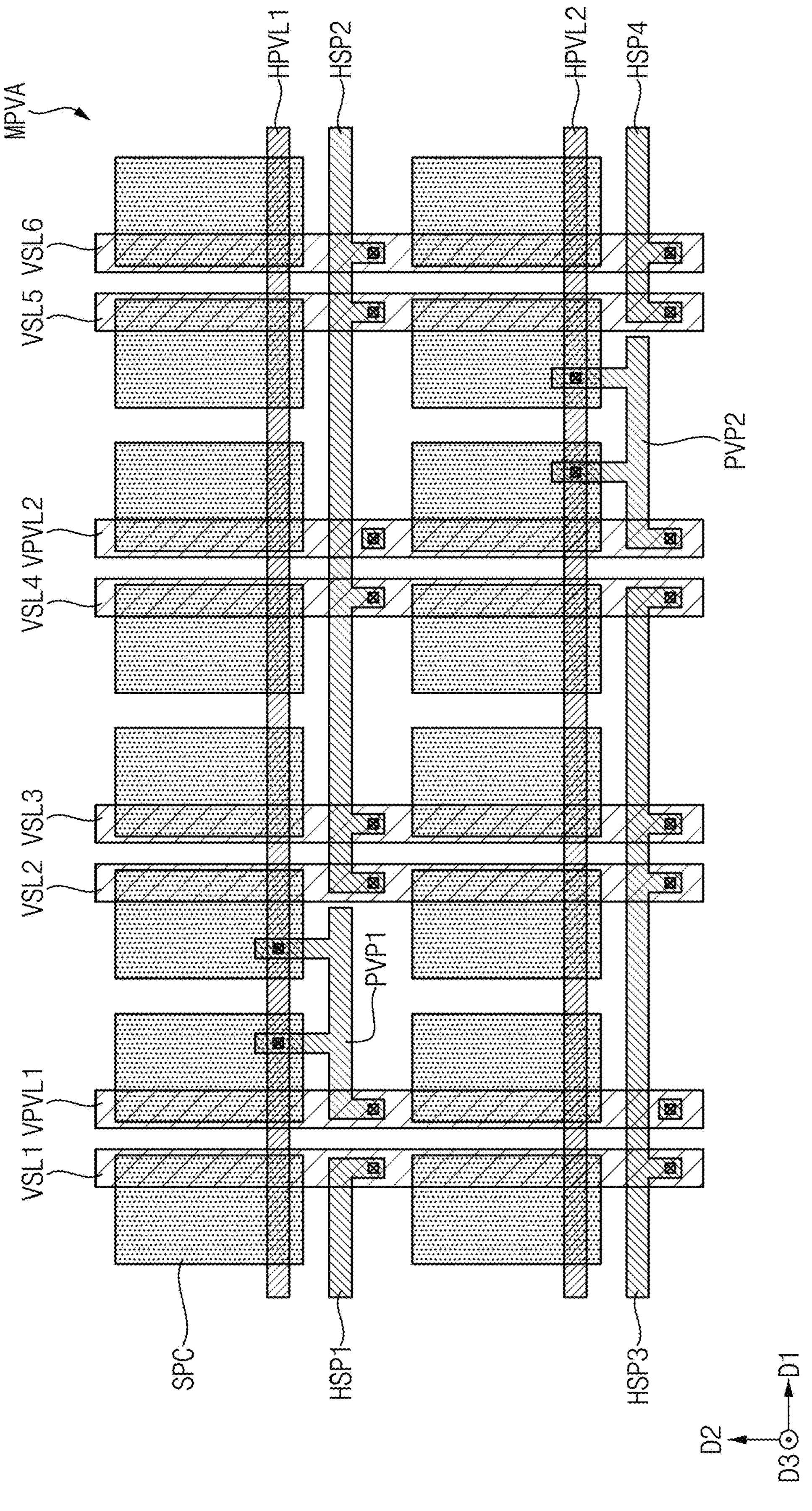
Figure 12:
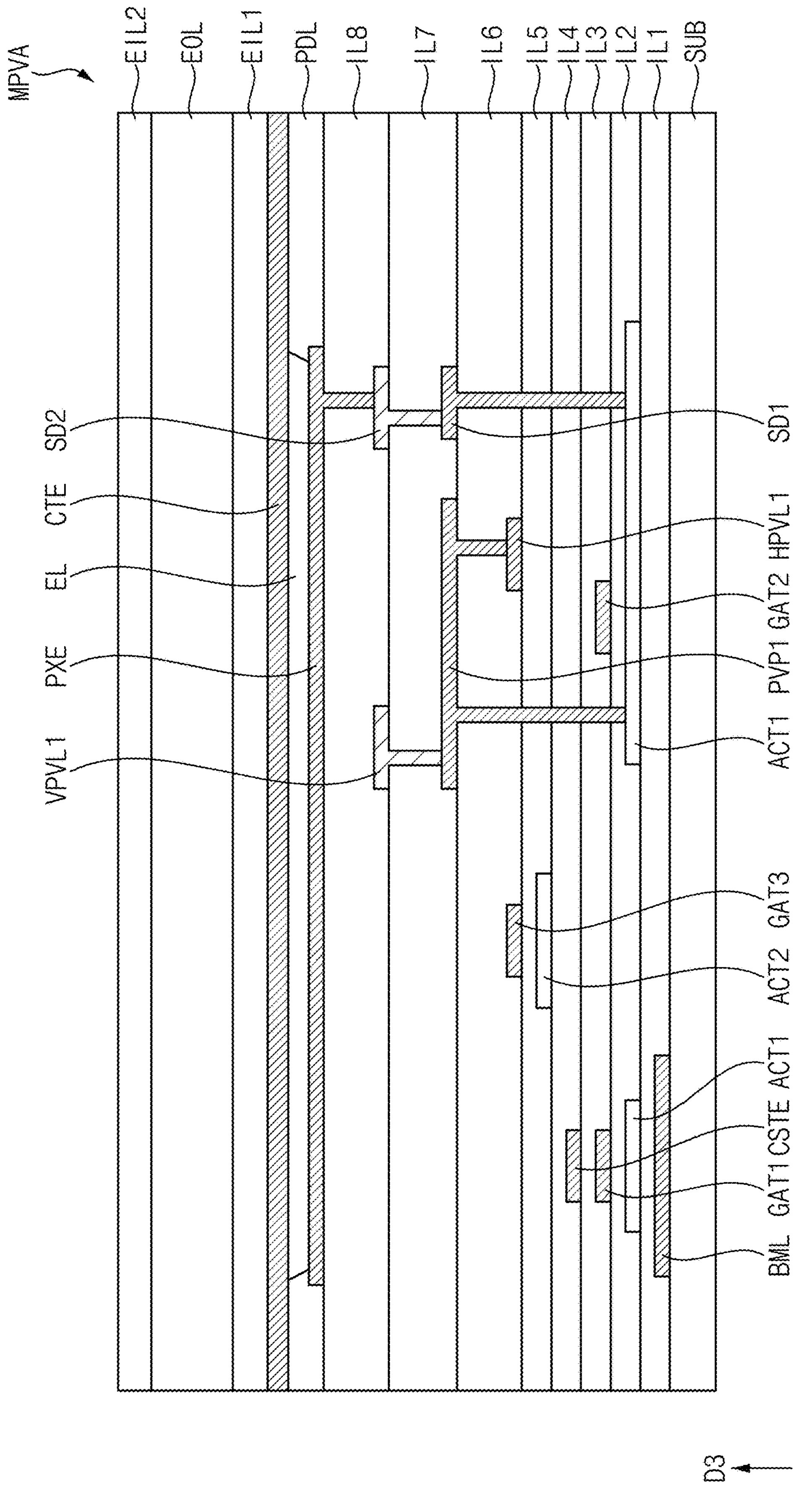
FIG. 12 is a cross-sectional view illustrating the mesh panel voltage area of FIG. 8.
Figure 13:
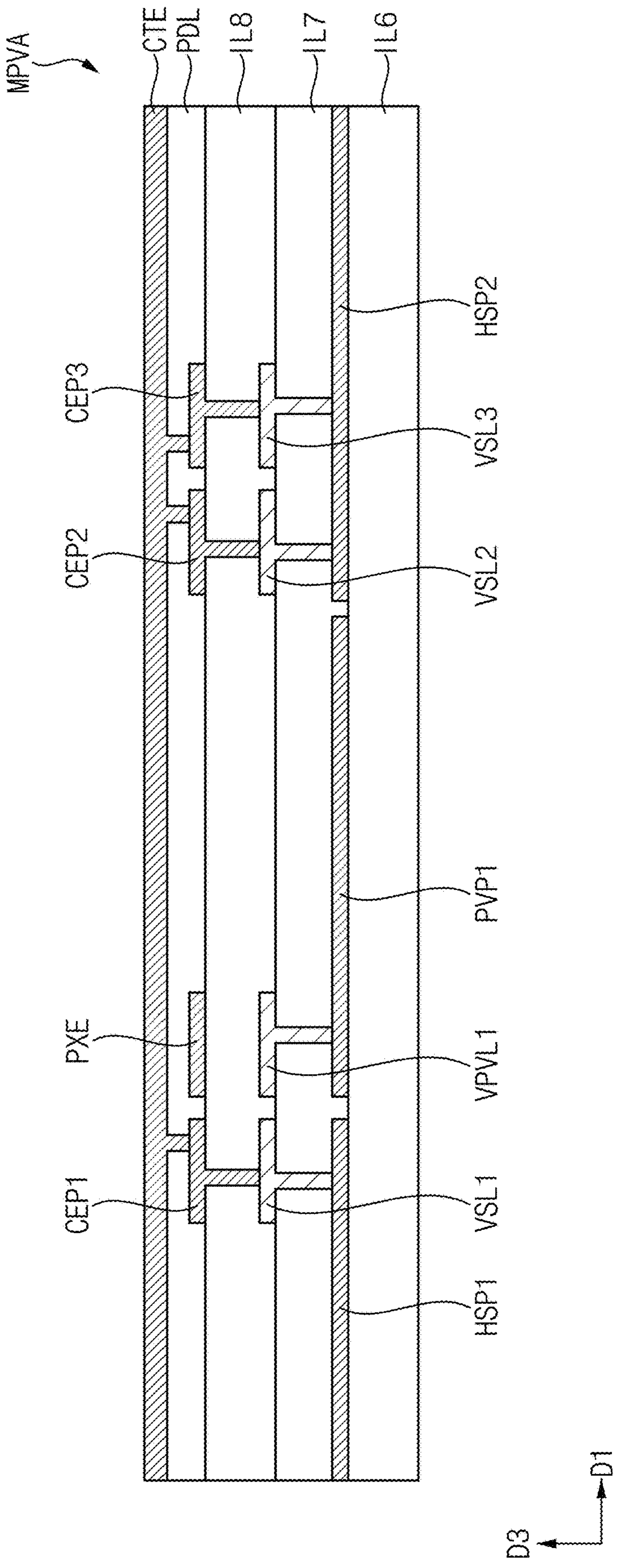
FIG. 13 is a cross-sectional view illustrating the mesh panel voltage area of FIG. 8.

FIG. 7 is a block diagram illustrating a mesh panel voltage area included in the display device of FIG. 1. FIG. 8 is an enlarged view illustrating the mesh panel voltage area of FIG. 7. FIGS. 9 to 11 are exploded views illustrating the mesh panel voltage area of FIG. 8. FIG. 12 is a cross-sectional view illustrating the mesh panel voltage area of FIG. 8. FIG. 13 is a cross-sectional view illustrating the mesh panel voltage area of FIG. 8.

Referring to FIG. 7, in the mesh panel voltage area MPVA, on the substrate SUB, the sub-pixel circuit SPC, a first horizontal panel constant voltage line HPVL1, a second horizontal panel constant voltage line HPVL2, a first horizontal low power voltage connecting pattern HSP1, a second horizontal low power voltage connecting pattern HSP2, a third horizontal low power voltage connecting pattern HSP3, a fourth horizontal low power voltage connecting pattern HSP4, a first vertical low voltage line VSL1, a first vertical panel constant voltage line VPVL1, a second vertical low voltage line VSL2, a third vertical low voltage line VSL3, a fourth vertical low voltage line VSL4, a second vertical panel constant voltage line VPVL2, a fifth vertical low voltage line VSL5, and a sixth vertical low voltage line VSL6 may be disposed.

In an embodiment, the sub-pixel circuits SPC may be arranged in the first direction D1 and the second direction D2. For example, the sub-pixel circuits SPC may be arranged in a matrix shape. The sub-pixel circuits SPC may be electrically connected to the first horizontal panel constant voltage line HPVL1 and/or the second horizontal panel constant voltage line HPVL2. The sub-pixel circuits SPC may receive the panel constant voltage PV from the first horizontal panel constant voltage line HPVL1 and/or the second horizontal panel constant voltage line HPVL2.

The first horizontal panel constant voltage line HPVL1 may extend in the first direction D1 and may transmit the panel constant voltage PV to the sub-pixel circuit SPC.

In an embodiment, the first horizontal panel constant voltage line HPVL1 may be electrically connected to the first vertical panel constant voltage line VPVL1 through a first panel constant voltage connecting pattern PVP1. The first horizontal panel constant voltage line HPVL1 may receive the panel constant voltage PV through the first vertical panel constant voltage line VPVL1 and the first panel constant voltage connecting pattern PVP1.

In an embodiment, the first horizontal panel voltage line HPVL1 may be electrically connected to the panel voltage bus PVB. The first horizontal panel voltage line HPVL1 may receive the panel voltage PV through the panel voltage bus PVB.

The second horizontal panel constant voltage line HPVL2 may extend in the first direction D1 and may transmit the panel constant voltage PV to the sub-pixel circuit SPC.

In an embodiment, the second horizontal panel constant voltage line HPVL2 may be electrically connected to the second vertical panel constant voltage line VPVL2 through the second panel constant voltage connecting pattern PVP2. The second horizontal panel constant voltage line HPVL2 may receive the panel constant voltage PV through the second vertical panel constant voltage line VPVL2 and the second panel constant voltage connecting pattern PVP2.

In an embodiment, the second horizontal panel voltage line HPVL2 may be electrically connected to the panel voltage bus PVB. The second horizontal panel voltage line HPVL2 may receive the panel voltage PV through the panel voltage bus PVB.

The first horizontal low voltage connecting pattern HSP1 may extend in the first direction D1. In an embodiment, the first horizontal low voltage connecting pattern HSP1 may be connected to the first vertical low voltage line VSL1 through a contact hole.

The second horizontal low voltage connecting pattern HSP2 may extend in the first direction D1. In an embodiment, the second horizontal low voltage connecting pattern HSP2 may be connected to at least one of the second to sixth vertical low voltage lines VSL2, VSL3, VSL4, VSL5, and VSL6 through a contact hole.

In an embodiment, the first horizontal low power voltage connecting pattern HSP1 and the second horizontal low power voltage connecting pattern HSP2 may be disconnected from each other. For example, the first horizontal low power voltage connecting pattern HSP1 and the second horizontal low power voltage connecting pattern HSP2 may be disconnected by the first panel constant voltage connecting pattern PVP1.

The third horizontal low voltage connecting pattern HSP3 may extend in the first direction D1. In an embodiment, the third horizontal low voltage connecting pattern HSP3 may be connected to at least one of the first to fourth vertical low voltage lines VSL1, VSL2, VSL3, and VSL4 through a contact hole.

The fourth horizontal low voltage connecting pattern HSP4 may extend in the first direction D1. In an embodiment, the fourth horizontal low voltage connecting pattern HSP4 may be connected to at least one of the fifth and sixth vertical low voltage lines VSL5 and VSL6 through a contact hole.

In an embodiment, the third horizontal low power voltage connecting pattern HSP3 and the fourth horizontal low power voltage connecting pattern HSP4 may be disconnected from each other. For example, the third horizontal low power voltage connecting pattern HSP3 and the fourth horizontal low power voltage connecting pattern HSP4 may be disconnected by the second panel constant voltage connecting pattern PVP2.

The first vertical low power voltage line VSL1 may extend in the second direction D2. In an embodiment, the first vertical low power voltage line VSL1 may be connected to the first horizontal low power voltage connecting pattern HSP1 and the third horizontal low power voltage connecting pattern HSP3 through a contact hole. The first vertical low power voltage line VSL1 may transmit the low power voltage ELVSS.

The first vertical panel constant voltage line VPVL1 may extend in the second direction D2. In an embodiment, the first vertical panel constant voltage line VPVL1 may be electrically connected to the first horizontal panel constant voltage line HPVL1 through the first panel constant voltage connecting pattern PVP1. The first vertical panel constant voltage line VPVL1 may transmit the panel constant voltage PV.

The second vertical low power voltage line VSL2 may extend in the second direction D2. In an embodiment, the second vertical low power voltage line VSL2 may be connected to the second horizontal low power voltage connecting pattern HSP2 and the third horizontal low power voltage connecting pattern HSP3 through a contact hole. The second vertical low power voltage line VSL2 may transmit the low power voltage ELVSS.

The third vertical low power voltage line VSL3 may extend in the second direction D2. In an embodiment, the third vertical low power voltage line VSL3 may be connected to the second horizontal low power voltage connecting pattern HSP2 and the third horizontal low power voltage connecting pattern HSP3 through a contact hole. The third vertical low power voltage line VSL3 may transmit the low power voltage ELVSS.

The fourth vertical low power voltage line VSL4 may extend in the second direction D2. In an embodiment, the fourth vertical low power voltage line VSL4 may be connected to the second horizontal low power voltage connecting pattern HSP2 and the third horizontal low power voltage connecting pattern HSP3 through a contact hole. The fourth vertical low power voltage line VSL4 may transmit the low power voltage ELVSS.

The second vertical panel constant voltage line VPVL2 may extend in the second direction D2. In an embodiment, the second vertical panel constant voltage line VPVL2 may be electrically connected to the second horizontal panel constant voltage line HPVL2 through the second panel constant voltage connecting pattern PVP2.

The fifth vertical low power voltage line VSL5 may extend in the second direction D2. In an embodiment, the fifth vertical low power voltage line VSL5 may be connected to the second horizontal low power voltage connecting pattern HSP2 and the fourth horizontal low power voltage connecting pattern HSP4 through a contact hole. The fifth vertical low power voltage line VSL5 may transmit the low power voltage ELVSS.

The sixth vertical low power voltage line VSL6 may extend in the second direction D2. In an embodiment, the sixth vertical low power voltage line VSL6 may be connected to the second horizontal low power voltage connecting pattern HSP2 and the fourth horizontal low power voltage connecting pattern HSP4 through a contact hole. The sixth vertical low power voltage line VSL6 may transmit the low power voltage ELVSS.

In an embodiment, the panel constant voltage PV may be transmitted to the sub-pixel circuit SPC through horizontal panel constant voltage lines extending in the first direction D1 and vertical panel constant voltage lines extending in the second direction D2. For example, as shown in FIG. 7, the panel constant voltage PV may be transmitted to the sub-pixel circuit SPC through the first and second horizontal panel constant voltage lines HPVL1 and HPVL2 extending in the first direction D1, and the first and second vertical panel constant voltage lines VPVL1 and VPVL2 extending in the second direction D2.

In other words, the horizontal panel constant voltage line and the vertical panel constant voltage line can be arranged in a mesh form within the display area DA. As the panel constant voltage PV is transmitted through the horizontal panel constant voltage line and the vertical panel constant voltage line, a voltage drop defect of the panel constant voltage PV may be prevented.

In addition, as described above with reference to FIG. 5, the vertical panel constant voltage line VPVL may be formed together with and be disposed on the same layer as the vertical bypass data line VBDL, and each of the first and second panel constant voltage connecting patterns PVP1 and PVP2 may be formed together with and be disposed on the same layer as the horizontal bypass data line HBDL. Accordingly, a separate process for forming the vertical panel constant voltage line and/or the panel constant voltage connecting pattern may not be added.

In an embodiment, the low power voltage ELVSS may be transmitted through horizontal low power voltage connecting patterns extending in the first direction D1 and vertical low power voltage lines extending in the second direction D2. For example, as shown in FIG. 7, the low power voltage ELVSS may be transmitted through first to fourth horizontal low power voltage connecting patterns HSP1, HSP2, HSP3, and HSP4 extending in the first direction D1 and the first to sixth vertical low power voltage lines VSL1, VSL2, VSL3, VSL4, VSL5, and VSL6 extending in the second direction D2.

In other words, the horizontal low power voltage connecting pattern and the vertical low power voltage line may be arranged in a mesh shape within the display area DA. As the low power voltage ELVSS is transmitted through the horizontal low power voltage connecting pattern and the vertical low power voltage line, a voltage drop defect of the low power voltage ELVSS may be prevented.

In addition, as described above with reference to FIG. 5, the vertical low power voltage line may be formed together with and be disposed on the same layer as the vertical bypass data line VBDL, and the horizontal low power voltage connecting pattern may be formed together with and be disposed on the same layer as the horizontal bypass data line HBDL. Accordingly, a separate process for forming the vertical low power voltage line and/or the horizontal low power voltage connecting pattern may not be added.

Referring to FIGS. 8 and 9, the first horizontal panel constant voltage line HPVL1 and the second horizontal panel constant voltage line HPVL2 may be formed. For example, the first horizontal panel constant voltage line HPVL1 and the second horizontal panel constant voltage line HPVL2 may be formed together on the same layer. The first horizontal panel constant voltage line HPVL1 and the second horizontal panel constant voltage line HPVL2 may extend in the first direction D1 and may be arranged in parallel along the second direction D2.

Referring to FIGS. 8 and 10, the first horizontal low power voltage connecting pattern HSP1, the first panel constant voltage connecting pattern PVP1, the second horizontal low power voltage connecting pattern HSP2, the third horizontal low power voltage connecting pattern HSP3, the second panel constant voltage connecting pattern PVP2, and the fourth horizontal low power voltage connecting pattern HSP4 may be formed. For example, the first horizontal low power voltage connecting pattern HSP1, the first panel constant voltage connecting pattern PVP1, the second horizontal low power voltage connecting pattern HSP2, the third horizontal low power voltage connecting pattern HSP3, the second panel constant voltage connecting pattern PVP2, and the fourth horizontal low power voltage connecting pattern HSP4 may be formed together on the same layer.

In an embodiment, the first horizontal low power voltage connecting pattern HSP1, the first panel constant voltage connecting pattern PVP1, and the second horizontal low power voltage connecting pattern HSP2 may be arranged in parallel along the first direction D1. In addition, the first panel constant voltage connecting pattern PVP1 may be disconnected from the first horizontal low power voltage connecting pattern HSP1 and the second horizontal low power voltage connecting pattern HSP2.

In an embodiment, the first panel constant voltage connecting pattern PVP1 may overlap the first horizontal panel constant voltage line HPVL1 and may be connected to the first horizontal panel constant voltage line HPVL1 through a contact hole.

In an embodiment, the third horizontal low power voltage connecting pattern HSP3, the second panel constant voltage connecting pattern PVP2, and the fourth horizontal low power voltage connecting pattern HSP4 may be arranged in parallel along the first direction D1. In addition, the second panel constant voltage connecting pattern PVP2 may be disconnected from the third horizontal low power voltage connecting pattern HSP3 and the fourth horizontal low power voltage connecting pattern HSP4.

In an embodiment, the second panel constant voltage connecting pattern PVP2 may overlap the second horizontal panel constant voltage line HPVL2 and may be connected to the second horizontal panel constant voltage line HPVL2 through a contact hole.

Referring to FIGS. 8 and 11, the first vertical low power voltage line VSL1, the first vertical panel constant voltage line VPVL1, the second vertical low power voltage line VSL2, the third vertical low power voltage line VSL3, the fourth vertical low power voltage line VSL4, the second vertical panel constant voltage line VPVL2, the fifth vertical low power voltage line VSL5, and the sixth vertical low power voltage line VSL6 may be formed. For example, the first vertical low power voltage line VSL1, the first vertical panel constant voltage line VPVL1, the second vertical low power voltage line VSL2, the third vertical low power voltage line VSL3, the fourth vertical low power voltage line VSL4, the second vertical panel constant voltage line VPVL2, the fifth vertical low power voltage line VSL5, and the sixth vertical low power voltage line VSL6 may be formed together on the same layer.

In an embodiment, the first vertical low power voltage line VSL1, the first vertical panel constant voltage line VPVL1, the second vertical low power voltage line VSL2, the third vertical low power voltage line VSL3, the fourth vertical low power voltage line VSL4, the second vertical panel constant voltage line VPVL2, the fifth vertical low power voltage line VSL5, and the sixth vertical low power voltage line VSL6 may be arranged in parallel along the first direction D1.

However, the present disclosure is not limited thereto, and the number of the vertical low power voltage lines, the number of the vertical panel constant voltage lines, and the arrangement of the vertical low power voltage lines and the vertical panel constant voltage lines may be appropriately set as needed. In addition, according to the arrangement of the vertical low power voltage lines and the vertical panel constant voltage lines, the number and arrangement of the horizontal low power voltage connecting patterns and the panel constant voltage connecting patterns may also be appropriately set.

Referring to FIG. 12, in the mesh panel voltage area MPVA, the display device DD1 may include the substrate SUB, a lower metal layer BML, a first insulating layer IL1, a first active pattern ACT1, a second insulating layer IL2, a first gate electrode GAT1, a second gate electrode GAT2, a third insulating layer IL3, a capacitor electrode CSTE, a fourth insulating layer IL4, a second active pattern ACT2, a fifth insulating layer IL5, a third gate electrode GAT3, the horizontal panel constant voltage line HPVL1, a sixth insulating layer IL6, the first panel constant voltage connecting pattern PVP1, a first connecting electrode SD1, a seventh insulating layer IL7, the first vertical panel constant voltage line VPVL1, a second connecting electrode SD2, an eighth insulating layer IL8, a pixel electrode PXE, a pixel defining layer PDL, an emission layer EL, a common electrode CTE, a first encapsulating inorganic layer EIL1, an encapsulating organic layer OL, and a second encapsulating inorganic layer EIL2.

The lower metal layer BML may be disposed on the substrate SUB. For example, the high power supply voltage ELVDD may be provided to the lower metal layer BML. In an embodiment, the lower metal layer BML may include a metal, an alloy, a conductive metal oxide, and the like. For example, the lower metal layer BML may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum (Pt), scandium (Sc), indium tin oxide (ITO), indium zinc oxide (IZO), or the like.

The first insulating layer IL1 may cover the lower metal layer BML and may be disposed on the substrate SUB. In an embodiment, the first insulating layer ISL1 may include an insulating material. For example, the first insulating layer ISL1 may include silicon oxide, silicon nitride, titanium oxide, tantalum oxide, or the like.

The first active pattern ACT1 may be disposed on the first insulating layer IL1. In an embodiment, the first active pattern ACT1 may include a silicon semiconductor, an oxide semiconductor, or the like. For example, the silicon semiconductor may include amorphous silicon, polycrystalline silicon, or the like. The first active pattern ACT1 may pass current or block current in response to a gate signal provided to the first gate electrode GAT1 or the second gate electrode GAT2, which is disposed on and overlaps the first active pattern ACT1.

The second insulating layer IL2 may cover the first active pattern ACT1 and may be disposed on the first insulating layer IL1. In an embodiment, the second insulating layer ISL2 may include an insulating material.

The first gate electrode GAT1 may be disposed on the second insulating layer IL2 and may overlap the first active pattern ACT1 and the lower metal layer BML. In an embodiment, the first gate electrode GAT1 may include a metal, an alloy, a conductive metal oxide, or the like.

The second gate electrode GAT2 may be disposed on the second insulating layer IL2 and may overlap the first active pattern ACT1. In an embodiment, the second gate electrode GAT2 may include a metal, an alloy, a conductive metal oxide, or the like.

In an embodiment, the first and second gate electrodes GAT1 and GAT2 may be disposed on the same layer and formed together.

The third insulating layer IL3 may cover the first and second gate electrodes GAT1 and GAT2 and may be disposed on the second insulating layer IL2. The third insulating layer IL3 may include an insulating material.

The capacitor electrode CSTE may be disposed on the third insulating layer IL3 and may overlap the first gate electrode GAT1. The capacitor electrode CSTE may form the storage capacitor CST together with the first gate electrode GAT1. In an embodiment, the capacitor electrode CSTE may include a metal, an alloy, a conductive metal oxide, or the like.

The fourth insulating layer IL4 may cover the capacitor electrode CSTE and may be disposed on the third insulating layer IL3. The fourth insulating layer IL4 may include an insulating material.

The second active pattern ACT2 may be disposed on the fourth insulating layer IL4. In an embodiment, the second active pattern ACT2 may include a silicon semiconductor, an oxide semiconductor, or the like. For example, the oxide semiconductor may include zinc (Zn), indium (In), gallium (Ga), tin (Sn), aluminum (Al), zinc oxide (ZnO), indium oxide (InO), indium gallium zinc oxide (In—Ga—Zn—O), zinc tin oxide (Zn—Sn—O), or the like. The second active pattern ACT2 may pass current or block current in response to a gate signal provided to the third gate electrode GAT3.

The fifth insulating layer IL5 may cover the second active pattern ACT2 and may be disposed on the fourth insulating layer IL4. The fifth insulating layer IL5 may include an insulating material.

The third gate electrode GAT3 may be disposed on the fifth insulating layer IL5 and may overlap the second active pattern ACT2. In an embodiment, the third gate electrode GAT3 may include a metal, an alloy, a conductive metal oxide, or the like.

The first horizontal panel constant voltage line HPVL1 may be arranged on the fifth insulating layer IL5. In an embodiment, the first horizontal panel constant voltage line HPVL1 may include a metal, an alloy, a conductive metal oxide, or the like.

In an embodiment, the first horizontal panel voltage line HPVL1 may be disposed on the same layer as the third gate electrode GAT3 and may be formed together with the third gate electrode GAT3.

The sixth insulating layer IL6 may cover the first horizontal panel constant voltage line HPVL1 and the third gate electrode GAT3 and may be disposed on the fifth insulating layer IL5. In an embodiment, the sixth insulating layer IL6 may include an insulating material. For example, the sixth insulating layer IL6 may include an organic material such as a photoresist, a polyacrylic resin, a polyimide resin, or an acrylic resin.

The first panel constant voltage pattern PVP1 may be disposed on the sixth insulating layer IL6. In an embodiment, the first panel constant voltage pattern PVP1 may include a metal, an alloy, a conductive metal oxide, or the like.

In an embodiment, the first panel constant voltage pattern PVP1 may overlap the first active pattern ACT1 and the first horizontal panel constant voltage line HPVL1. In addition, the first panel constant voltage pattern PVP1 may be connected to the first active pattern ACT1 and the first horizontal panel constant voltage line HPVL1. Accordingly, the first panel constant voltage pattern PVP1 may electrically connect the first active pattern ACT1 and the first horizontal panel constant voltage line HPVL1.

The first connecting electrode SD1 may be disposed on the sixth insulating layer IL6. In an embodiment, the first connecting electrode SD1 may include a metal, an alloy, a conductive metal oxide, or the like. The first connecting electrode SD1 may be connected to the first active pattern ACT1.

In an embodiment, the first panel constant voltage pattern PVP1 may be disposed on the same layer as the first connecting electrode SD1 and may be formed together with the first connecting electrode SD1.

The seventh insulating layer IL7 may cover the first panel constant voltage pattern PVP1 and the first connecting electrode SD1 and may be disposed on the sixth insulating layer IL6. In an embodiment, the seventh insulating layer IL7 may include an insulating material.

The first vertical panel constant voltage line VPVL1 may be disposed on the seventh insulating layer IL7. In an embodiment, the first vertical panel constant voltage line VPVL1 may include a metal, an alloy, a conductive metal oxide, or the like.

In an embodiment, the first vertical panel constant voltage line VPVL1 may overlap the first panel constant voltage connecting pattern PVP1 and may be connected to the first panel constant voltage connecting pattern PVP1. In other words, the first vertical panel constant voltage line VPVL1 may be electrically connected to the first active pattern ACT1 and the first horizontal panel constant voltage line HPVL1, through the first panel constant voltage connecting pattern PVP1. The first vertical panel constant voltage line VPVL1 may transmit the panel constant voltage PV to the first active pattern ACT1 and the first horizontal panel constant voltage line HPVL1.

The second connecting electrode SD2 may be disposed on the seventh insulating layer IL7. In an embodiment, the second connecting electrode SD2 may include a metal, an alloy, a conductive metal oxide, or the like. The second connecting electrode SD2 may be connected to the first connecting electrode SD1.

In an embodiment, the first vertical panel voltage line VPVL1 may be disposed on the same layer as the second connecting electrode SD2 and may be formed together with the second connecting electrode SD2.

The eighth insulating layer IL8 may cover the first vertical panel constant voltage VPVL1 and the second connecting electrode SD2 and may be disposed on the seventh insulating layer IL7. In an embodiment, the eighth insulating layer IL8 may include an insulating material.

The pixel electrode PXE may be disposed on the eighth insulating layer IL8. In an embodiment, the pixel electrode PXE may include a metal, an alloy, a conductive metal oxide, or the like. In addition, the pixel electrode PXE may be connected to the second connecting electrode SD2.

The panel constant voltage PV provided from the first vertical panel constant voltage line VPVL1 may be transmitted to the first active pattern ACT1 through the first panel constant voltage connecting pattern PVP1. The panel constant voltage PV may be transmitted to the pixel electrode PXE through the first connecting electrode SD1 and the second connecting electrode SD2 in response to a gate signal transmitted to the second gate electrode GAT2.

The pixel defining layer PDL may be disposed on the eighth insulating layer IL8. In an embodiment, the pixel defining layer PDL may include an organic material such as a polyimide-based resin (e.g., a photosensitive polyimide-based resin (PSPI)), a photoresist, a polyacrylic-based resin or an acrylic resin, or the pixel defining layer PDL may include an inorganic material such as silicon oxide or silicon nitride.

The emission layer EL may be disposed on the pixel electrode PXE. The emission layer EL may generate light based on a voltage difference between the pixel electrode PXE and the common electrode CTE.

The common electrode CTE may be disposed on the emission layer EL. The low power supply voltage ELVSS may be provided to the common electrode CTE.

The first encapsulating inorganic layer EIL1 may be disposed on the common electrode CTE and may include an inorganic material. The encapsulating organic layer OIL may be disposed on the first encapsulating inorganic layer EIL1 and may include an organic material. The second encapsulating inorganic layer EIL2 may be disposed on the encapsulating organic layer OIL and may include an inorganic material.

Referring to FIG. 13, the first horizontal low power voltage pattern HSP1, the first panel constant voltage connecting pattern PVP1, and the second horizontal low power voltage connecting pattern HSP2 may be disposed on the sixth insulating layer IL6.

As described above, the first horizontal low power voltage pattern HSP1, the first panel constant voltage connecting pattern PVP1, and the second horizontal low power voltage connecting pattern HSP2 may be disposed on the same layer and may be formed together.

In addition, as depicted in FIG. 8, the first horizontal low power voltage pattern HSP1, the first panel constant voltage connecting pattern PVP1, and the second horizontal low power voltage connecting pattern HSP2 may extend in the first direction D1 and be spaced apart from each other along the first direction D1.

In addition, the first panel constant voltage connecting pattern PVP1 may be disconnected from the first horizontal low power voltage pattern HSP1 and the second horizontal low power voltage connecting pattern HSP2.

The first vertical low power voltage line VSL1, the first vertical panel constant voltage line VPVL1, the second vertical low power voltage line VSL2, and the third vertical low power voltage line VSL3 may be disposed on the seventh insulating layer IL7.

As described above, the first vertical low power voltage line VSL1, the first vertical panel constant voltage line VPVL1, the second vertical low power voltage line VSL2, and the third vertical low power voltage line VSL3 may be disposed on the same layer and formed together.

In addition, as depicted in FIG. 8, the first vertical low power voltage line VSL1, the first vertical panel constant voltage line VPVL1, the second vertical low power voltage line VSL2, and the third vertical low power voltage line VSL3 may extend in the second direction D2 and arranged in parallel along the first direction D1.

The first vertical low power voltage line VSL1 may be connected to the first horizontal low power voltage connecting pattern HSP1, and the second and third vertical low power voltage lines VSL2 and VSL3 may be connected to the second horizontal low power voltage connecting pattern HSP2.

A first cathode connecting electrode CEP1, the pixel electrode PXE, a second cathode connecting electrode CEP2, and a third cathode connecting electrode CEP3 may be disposed on the eighth insulating layer IL8.

In an embodiment, the first cathode connecting electrode CEP1, the pixel electrode PXE, the second cathode connecting electrode CEP2, and the third cathode connecting electrode CEP3 may be disposed on the same layer and formed together.

The first cathode connecting electrode CEP1 may be connected to the first vertical low power voltage line VSL1, the second cathode connecting electrode CEP2 may be connected to the second vertical low power voltage line VSL2, and the third cathode connecting electrode CEP3 may be connected to the third vertical low power voltage line VSL3.

The common electrode CTE may be connected to the first cathode connecting electrode CEP1, the second cathode connecting electrode CEP2, and the third cathode connecting electrode CEP3.

In an embodiment, the low power voltage ELVSS may be transmitted to the common electrode CTE, through a horizontal low power voltage connecting pattern extending in the first direction D1 and a vertical low power voltage line extending in the second direction D2. For example, the low power voltage ELVSS may be transmitted to the common electrode CTE, through the first and second horizontal low power voltage connecting patterns HSP1 and HSP2 extending in the first direction D1 and the first to third vertical low power voltage lines VSL1, VSL2, and VSL3 extending in the second direction D2.

In other words, the horizontal low power voltage connecting pattern and the vertical low power voltage line may be arranged in a mesh shape within the display area DA. As the low power voltage ELVSS is transmitted through the horizontal low power voltage connecting pattern and the vertical low power voltage line, a voltage drop defect of the low power voltage ELVSS may be prevented.

In addition, as described above with reference to FIG. 5, the vertical low power voltage line may be formed together with and be disposed on the same layer as the vertical bypass data line VBDL, and the horizontal low power voltage connecting pattern may be formed together with and be disposed on the same layer as the horizontal bypass data line HBDL. Accordingly, a separate process for forming the vertical low power voltage line and/or the horizontal low power voltage connecting pattern may not be added.

Figure 14:
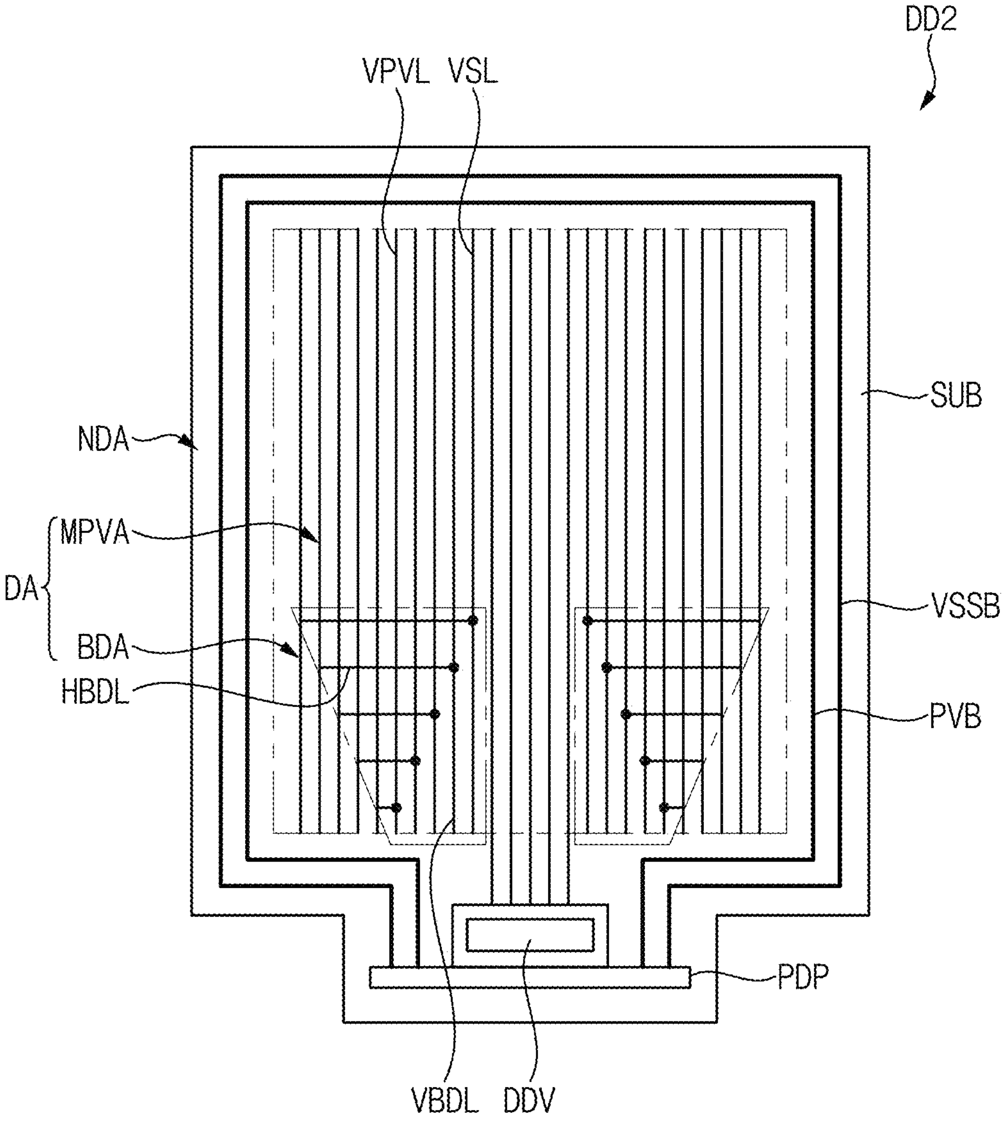
FIG. 14 is a plan view illustrating a display device according to an embodiment of the present disclosure.
Figure 15:
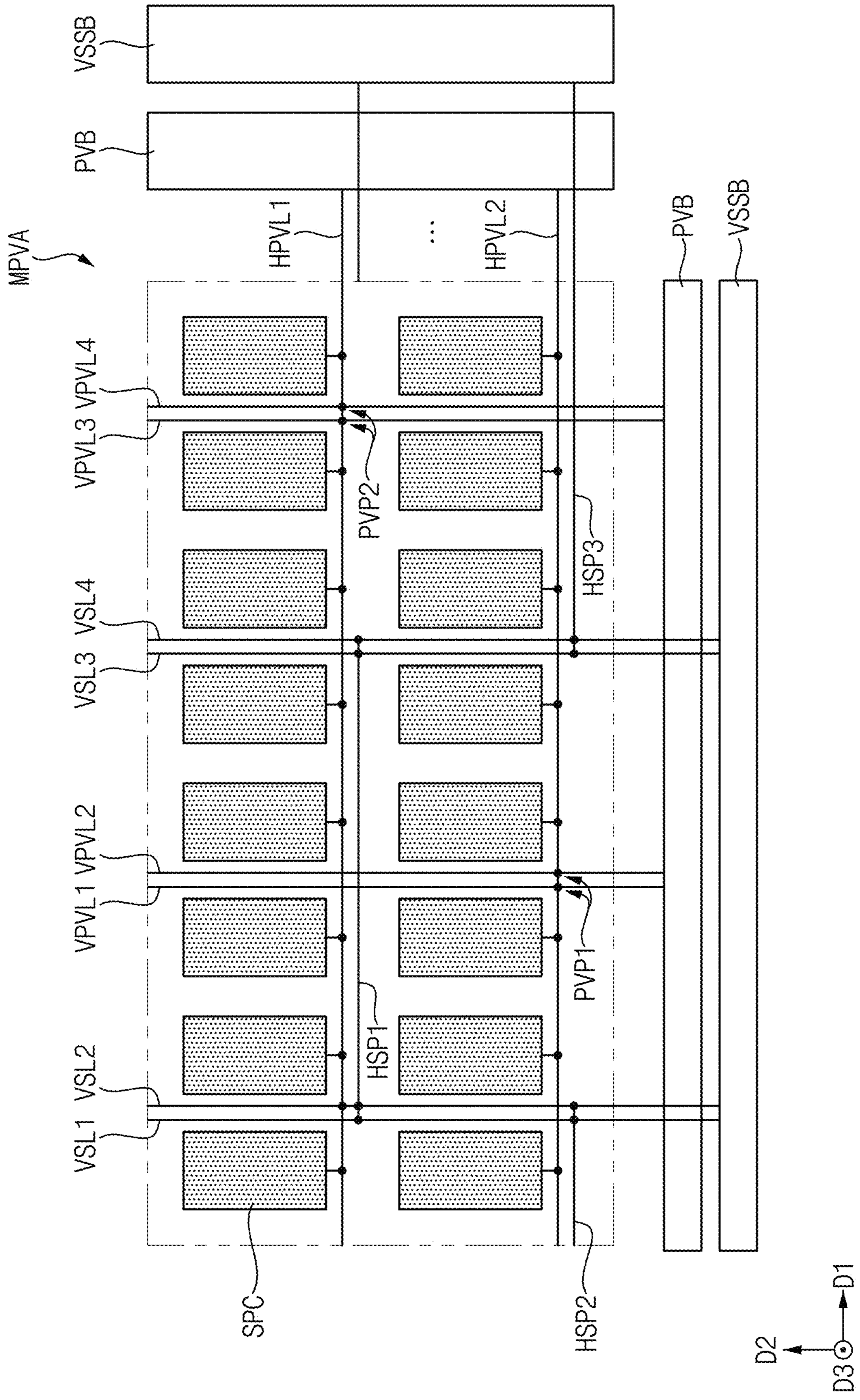
FIG. 15 is a block diagram illustrating a mesh panel voltage area included in the display device of FIG. 14.
Figure 16:
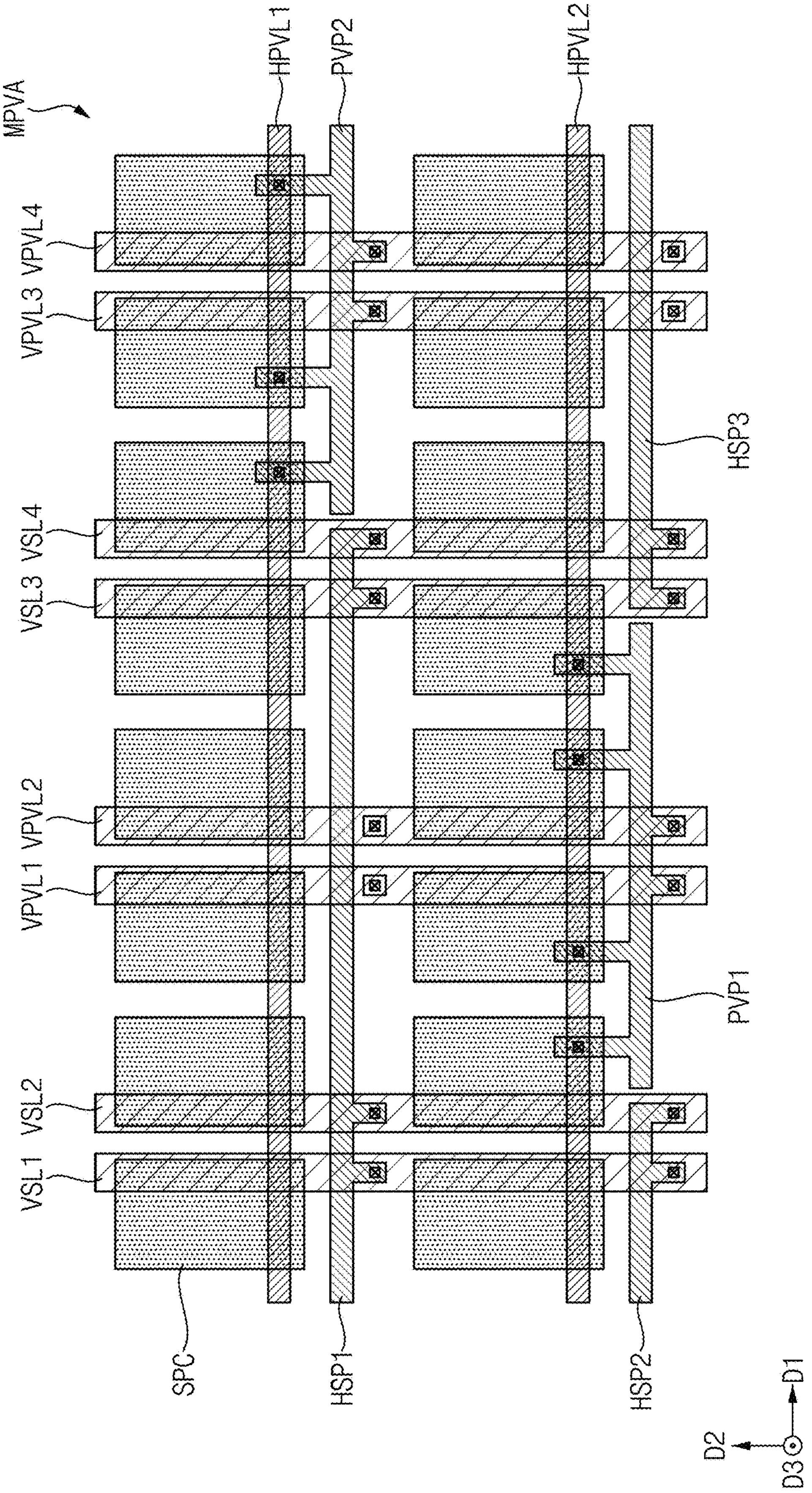
FIG. 16 is an enlarged view illustrating the mesh panel voltage area of FIG. 15.

FIG. 14 is a plan view illustrating a display device according to an embodiment of the present disclosure. FIG. 15 is a block diagram illustrating a mesh panel voltage area included in the display device of FIG. 14. FIG. 16 is an enlarged view illustrating the mesh panel voltage area of FIG. 15.

Referring to FIG. 14, a display device DD2 according to an embodiment of the present disclosure may be divided into a display area DA and a non-display area NDA. The display area DA may be an area where an image is displayed and may be an area where a light emitting diode is arranged. The non-display area NDA may be an area surrounding at least a portion of the display area DA.

However, the display device DD2 may be substantially the same as the display device DD1 described with reference to FIG. 5, except for the contents described below.

Referring to FIG. 15, in the mesh panel voltage area MPVA, the sub-pixel circuit SPC, a first horizontal panel constant voltage line HPVL1, a second horizontal panel constant voltage line HPVL2, a first horizontal low power voltage connecting pattern HSP1, a second horizontal low power voltage connecting pattern HSP2, a third horizontal low power voltage connecting pattern HSP3, a first vertical low voltage line VSL1, a second vertical low voltage line VSL2, a first vertical panel constant voltage line VPVL1, a second vertical panel constant voltage line VPVL2, a third vertical low voltage line VSL3, a fourth vertical low voltage line VSL4, a third vertical panel constant voltage line VPVL3, and a fourth vertical panel constant voltage line VPVL4 may be disposed on the substrate SUB.

In an embodiment, the sub-pixel circuits SPC may be arranged in the first direction D1 and the second direction D2. For example, the sub-pixel circuits SPC may be arranged in a matrix shape. The sub-pixel circuits SPC may be electrically connected to the first horizontal panel constant voltage line HPVL1 and/or the second horizontal panel constant voltage line HPVL2. The sub-pixel circuits SPC may receive the panel constant voltage PV from the first horizontal panel constant voltage line HPVL1 and/or the second horizontal panel constant voltage line HPVL2.

The first horizontal panel constant voltage line HPVL1 may extend in the first direction D1 and may transmit the panel constant voltage PV to the sub-pixel circuit SPC.

In an embodiment, the first horizontal panel constant voltage line HPVL1 may be electrically connected to the third and fourth vertical panel constant voltage lines VPVL3 and VPVL4, through the second panel constant voltage connecting pattern PVP2. The first horizontal panel constant voltage line HPVL1 may receive the panel constant voltage PV, through the third vertical panel constant voltage line VPVL3, the fourth vertical panel constant voltage line VPVL4, and the second panel constant voltage connecting pattern PVP2.

The second horizontal panel constant voltage line HPVL2 may extend in the first direction D1 and may transmit the panel constant voltage PV to the sub-pixel circuit SPC.

In an embodiment, the second horizontal panel constant voltage line HPVL2 may be electrically connected to the first and second vertical panel constant voltage lines VPVL1 and VPVL2, through the first panel constant voltage connecting pattern PVP1. The second horizontal panel constant voltage line HPVL2 may receive the panel constant voltage PV, through the first vertical panel constant voltage line VPVL1, the second vertical panel constant voltage line VPVL2, and the first panel constant voltage connecting pattern PVP1.

The first horizontal low voltage connecting pattern HSP1 may extend in the first direction D1. In an embodiment, the first horizontal low voltage connecting pattern HSP1 may be connected to at least one of the first to fourth vertical low voltage lines VSL1, VSL2, VSL3, and VSL4.

The second horizontal low voltage connecting pattern HSP2 may extend in the first direction D1. The first low power voltage connecting pattern HSP1 and the second low power voltage connecting pattern HSP2 are arranged in parallel and spaced apart from each other along the second direction. In an embodiment, the second horizontal low voltage connecting pattern HSP2 may be connected to at least one of the first and second vertical low voltage lines VSL1 and VSL2.

The third horizontal low voltage connecting pattern HSP3 may extend in the first direction D1. In an embodiment, the third horizontal low voltage connecting pattern HSP3 may be connected to at least one of the third and fourth vertical low voltage lines VSL3 and VSL4 through a contact hole.

In an embodiment, the second horizontal low power voltage connecting pattern HSP2 and the third horizontal low power voltage connecting pattern HSP3 may be disconnected from each other. For example, the second horizontal low power voltage connecting pattern HSP2 and the third horizontal low power voltage connecting pattern HSP3 may be disconnected by the first panel constant voltage connecting pattern PVP1.

The first vertical low power voltage line VSL1 may extend in the second direction D2. In an embodiment, the first vertical low power voltage line VSL1 may be connected to the first horizontal low power voltage connecting pattern HSP1 and the second horizontal low power voltage connecting pattern HSP2, through a contact hole. The first vertical low power voltage line VSL1 may transmit the low power voltage ELVSS.

The second vertical low power voltage line VSL2 may extend in the second direction D2. In an embodiment, the second vertical low power voltage line VSL2 may be connected to the first horizontal low power voltage connecting pattern HSP1 and the second horizontal low power voltage connecting pattern HSP2, through a contact hole. The second vertical low power voltage line VSL2 may transmit the low power voltage ELVSS.

The first vertical panel constant voltage line VPVL1 may extend in the second direction D2. In an embodiment, the first vertical panel constant voltage line VPVL1 may be electrically connected to the second horizontal panel constant voltage line HPVL2, through the first panel constant voltage connecting pattern PVP1. The first vertical panel constant voltage line VPVL1 may transmit the panel constant voltage PV.

The second vertical panel constant voltage line VPVL2 may extend in the second direction D2. In an embodiment, the second vertical panel constant voltage line VPVL2 may be electrically connected to the second horizontal panel constant voltage line HPVL2, through the first panel constant voltage connecting pattern PVP1. The second vertical panel constant voltage line VPVL2 may transmit the panel constant voltage PV.

The third vertical low power voltage line VSL3 may extend in the second direction D2. In an embodiment, the third vertical low power voltage line VSL3 may be connected to the first horizontal low power voltage connecting pattern HSP1 and the third horizontal low power voltage connecting pattern HSP3, through a contact hole. The third vertical low power voltage line VSL3 may transmit the low power voltage ELVSS.

The fourth vertical low power voltage line VSL4 may extend in the second direction D2. In an embodiment, the fourth vertical low power voltage line VSL4 may be connected to the first horizontal low power voltage connecting pattern HSP1 and the third horizontal low power voltage connecting pattern HSP3 through a contact hole. The fourth vertical low power voltage line VSLA may transmit the low power voltage ELVSS.

The third vertical panel constant voltage line VPVL3 may extend in the second direction D2. In an embodiment, the third vertical panel constant voltage line VPVL3 may be electrically connected to the first horizontal panel constant voltage line HPVL1, through the second panel constant voltage connecting pattern PVP2. The third vertical panel constant voltage line VPVL3 may transmit the panel constant voltage PV.

The fourth vertical panel constant voltage line VPVL4 may extend in the second direction D2. In an embodiment, the fourth vertical panel constant voltage line VPVL4 may be electrically connected to the first horizontal panel constant voltage line HPVL1, through the second panel constant voltage connecting pattern PVP2. The fourth vertical panel constant voltage line VPVL4 may transmit the panel constant voltage PV.

Referring to FIG. 16, the first horizontal panel constant voltage line HPVL1 and the second horizontal panel constant voltage line HPVL2 may be formed. For example, the first horizontal panel constant voltage line HPVL1 and the second horizontal panel constant voltage line HPVL2 may be formed together on the same layer. The first horizontal panel constant voltage line HPVL1 and the second horizontal panel constant voltage line HPVL2 may extend in the first direction D1 and may be arranged in parallel along the second direction D2.

The first horizontal low power voltage connecting pattern HSP1, the second horizontal low power voltage connecting pattern HSP2, the first panel constant voltage connecting pattern PVP1, the third horizontal low power voltage connecting pattern HSP3, and the second panel constant voltage connecting pattern PVP2 may be formed. For example, the first horizontal low power voltage connecting pattern HSP1, the second horizontal low power voltage connecting pattern HSP2, the first panel constant voltage connecting pattern PVP1, the third horizontal low power voltage connecting pattern HSP3, and the second panel constant voltage connecting pattern PVP2 may be formed together on the same layer.

In an embodiment, the first horizontal low power voltage connecting pattern HSP1 and the second panel constant voltage connecting pattern PVP2 may extend in the first direction D1 and are spaced apart from each other along the first direction D1. In addition, the second panel constant voltage connecting pattern PVP2 may be disconnected from the first horizontal low power voltage connecting pattern HSP1.

In an embodiment, the second panel constant voltage connecting pattern PVP2 may overlap the first horizontal panel constant voltage line HPVL1 and may be connected to the first horizontal panel constant voltage line HPVL1 through a contact hole.

In an embodiment, the second horizontal low power voltage connecting pattern HSP2, the first panel constant voltage connecting pattern PVP1, and the third horizontal low power voltage connecting pattern HSP3 may extend in the first direction D1 and are spaced apart from each other along the first direction D1. In addition, the first panel constant voltage connecting pattern PVP1 may be disconnected from the second horizontal low power voltage connecting pattern HSP2 and the third horizontal low power voltage connecting pattern HSP3.

In an embodiment, the first panel constant voltage connecting pattern PVP1 may overlap the second horizontal panel constant voltage line HPVL2 and may be connected to the second horizontal panel constant voltage line HPVL2 through a contact hole.

The first vertical low power voltage line VSL1, the second vertical low power voltage line VSL2, the first vertical panel constant voltage line VPVL1, the second vertical panel constant voltage line VPVL2, the third vertical low power voltage line VSL3, the fourth vertical low power voltage line VSL4, the third vertical panel constant voltage line VPVL3, and the fourth vertical panel constant voltage line VPVL4 may be formed. For example, The first vertical low power voltage line VSL1, the second vertical low power voltage line VSL2, the first vertical panel constant voltage line VPVL1, the second vertical panel constant voltage line VPVL2, the third vertical low power voltage line VSL3, the fourth vertical low power voltage line VSL4, the third vertical panel constant voltage line VPVL3, and the fourth vertical panel constant voltage line VPVL4 may be formed together on the same layer.

In an embodiment, the first vertical low power voltage line VSL1, the second vertical low power voltage line VSL2, the first vertical panel constant voltage line VPVL1, the second vertical panel constant voltage line VPVL2, the third vertical low power voltage line VSL3, the fourth vertical low power voltage line VSL4, the third vertical panel constant voltage line VPVL3, and the fourth vertical panel constant voltage line VPVL4 may extend in the second direction D2 and be arranged in parallel along the first direction D1.

Figure 17:
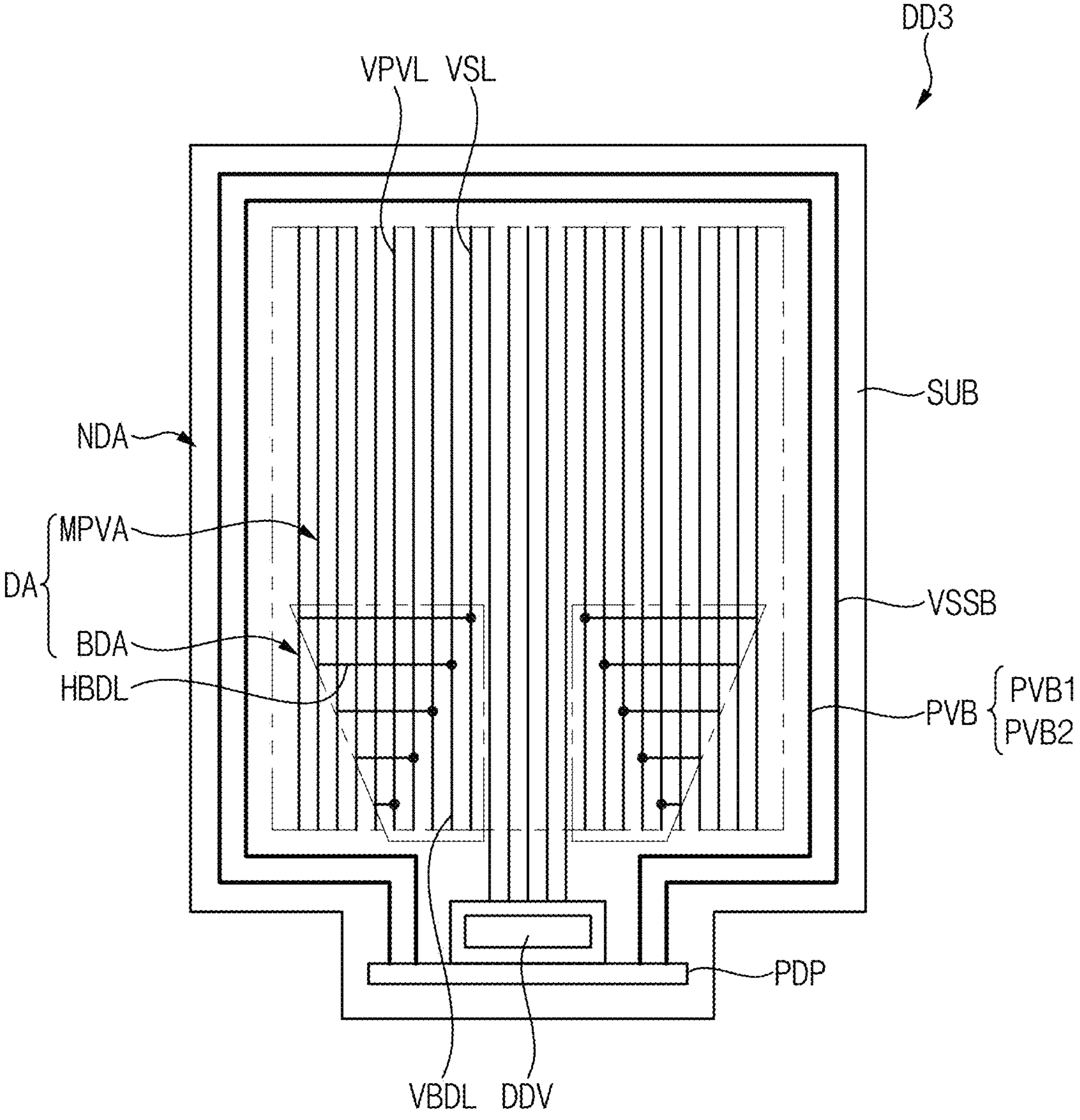
FIG. 17 is a plan view illustrating a display device according to an embodiment of the present disclosure.
Figure 18:
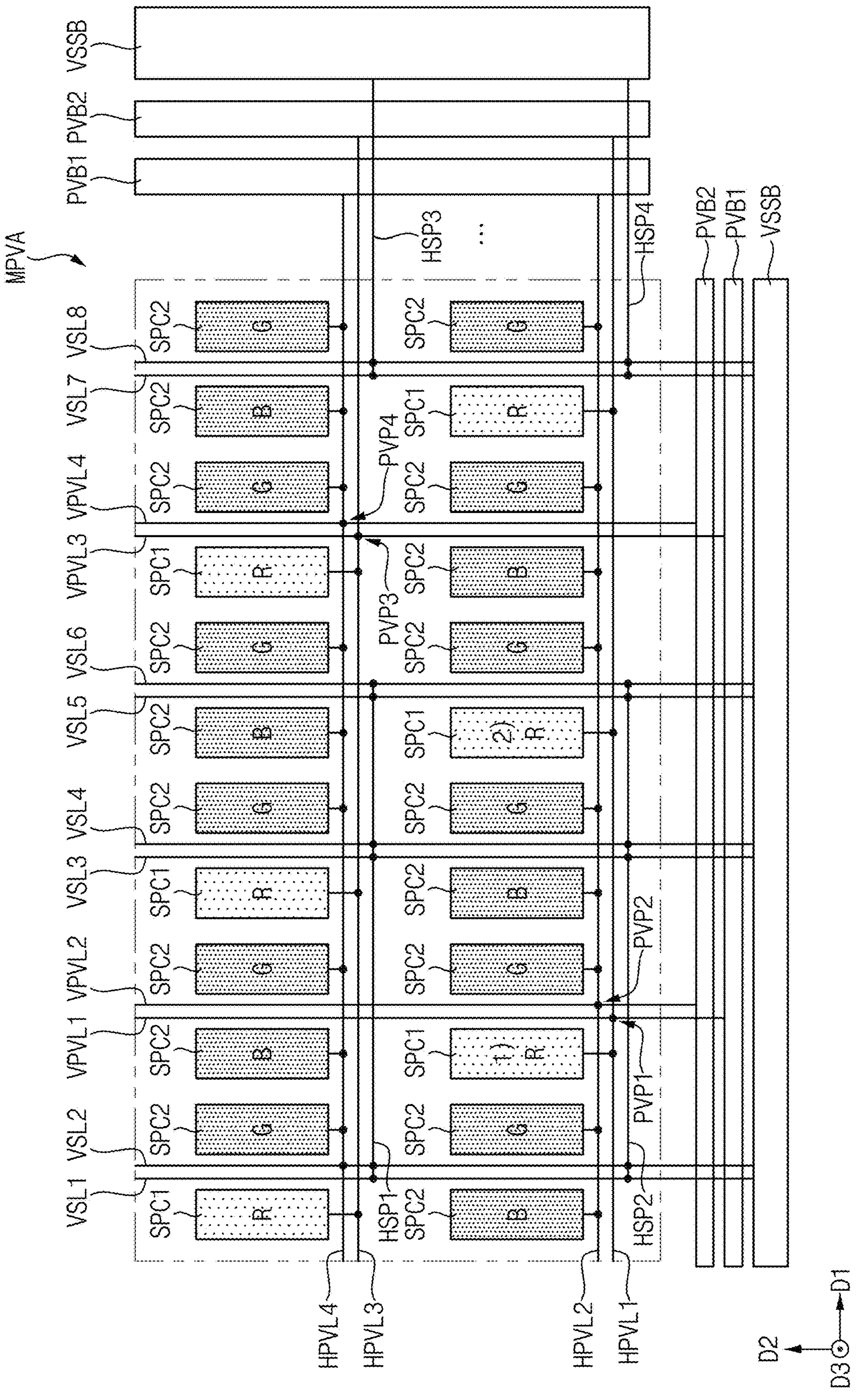
FIG. 18 is a block diagram illustrating a mesh panel voltage area included in the display device of FIG. 17.

FIG. 17 is a plan view illustrating a display device according to an embodiment of the present disclosure. FIG. 18 is a block diagram illustrating a mesh panel voltage area included in the display device of FIG. 17.

Referring to FIG. 17, a display device DD3 according to an embodiment of the present disclosure may be divided into a display area DA and a non-display area NDA. The display area DA may be an area where an image is displayed and may be an area where a light emitting diode is arranged. The non-display area NDA may be an area surrounding at least a portion of the display area DA.

However, the display device DD3 may be substantially the same as the display device DD1 described with reference to FIG. 5, except for the contents described below.

Referring to FIG. 18, in the mesh panel voltage area MPVA, a first sub-pixel circuit SPC1, a second sub-pixel circuit SPC2, a first horizontal panel constant voltage line HPVL1, a second horizontal panel constant voltage line HPVL2, a third horizontal panel constant voltage line HPVL3, a fourth horizontal panel constant voltage line HPVL4, a first horizontal low power voltage connecting pattern HSP1, a second horizontal low power voltage connecting pattern HSP2, a third horizontal low power voltage connecting pattern HSP3, a fourth horizontal low power voltage connecting pattern HSP4, a first vertical low voltage line VSL1, a second vertical low voltage line VSL2, a first vertical panel constant voltage line VPVL1, a second vertical panel constant voltage line VPVL2, a third vertical low voltage line VSL3, a fourth vertical low voltage line VSL4, a fifth vertical low voltage line VSL5, a sixth vertical low voltage line VSL6, a third vertical panel constant voltage line VPVL3, a fourth vertical panel constant voltage line VPVL4, a seventh vertical low voltage line VSL7, and an eighth vertical low voltage line VSL8 may be disposed on the substrate SUB.

In an embodiment, the sub-pixel circuit SPC may include a first sub-pixel circuit SPC1 and a second sub-pixel circuit SPC2. For example, the first sub-pixel circuit SPC1 may be provided with a first panel constant voltage, and the second sub-pixel circuit SPC2 may be provided with a second panel constant voltage that is different from the first panel constant voltage. For example, the first sub-pixel circuit SPC1 may be a sub-pixel circuit electrically connected to a red light emitting diode. The second sub-pixel circuit SPC2 may be a sub-pixel circuit electrically connected to a green light emitting diode or a blue light emitting diode. In addition, the first panel constant voltage may be a first anode initialization voltage, and the second panel constant voltage may be a second anode initialization voltage.

The first sub-pixel circuit SPC1 may be electrically connected to the first horizontal panel constant voltage line HPVL1 and/or the third horizontal panel constant voltage line HPVL3. The first sub-pixel circuit SPC1 may receive the first panel constant voltage from the first horizontal panel constant voltage line HPVL1 and/or the third horizontal panel constant voltage line HPVL3.

The second sub-pixel circuit SPC2 may be electrically connected to the second horizontal panel constant voltage line HPVL2 and/or the fourth horizontal panel constant voltage line HPVLA. The second sub-pixel circuit SPC2 may receive the second panel constant voltage from the second horizontal panel constant voltage line HPVL2 and/or the fourth horizontal panel constant voltage line HPVL4.

The first horizontal panel constant voltage line HPVL1 may extend in the first direction D1 and may transmit the first panel constant voltage to the first sub-pixel circuit SPC1.

In an embodiment, the first horizontal panel constant voltage line HPVL1 may be electrically connected to the first vertical panel constant voltage line VPVL1, through the first panel constant voltage connecting pattern PVP1. The first horizontal panel constant voltage line HPVL1 may receive the first panel constant voltage, through the first vertical panel constant voltage line VPVL1 and the first panel constant voltage connecting pattern PVP1.

The second horizontal panel constant voltage line HPVL2 may extend in the first direction D1 and may transmit the second panel constant voltage to the second sub-pixel circuit SPC2.

In an embodiment, the second horizontal panel constant voltage line HPVL2 may be electrically connected to the second vertical panel constant voltage line VPVL2, through the second panel constant voltage connecting pattern PVP2. The second horizontal panel constant voltage line HPVL2 may receive the second panel constant voltage, through the second vertical panel constant voltage line VPVL2 and the second panel constant voltage connecting pattern PVP2.

The third horizontal panel constant voltage line HPVL3 may extend in the first direction D1 and may transmit the first panel constant voltage to the first sub-pixel circuit SPC1.

In an embodiment, the third horizontal panel constant voltage line HPVL3 may be electrically connected to the third vertical panel constant voltage line VPVL3, through the third panel constant voltage connecting pattern PVP3. The third horizontal panel constant voltage line HPVL3 may receive the first panel constant voltage, through the third vertical panel constant voltage line VPVL3 and the third panel constant voltage connecting pattern PVP3.

The fourth horizontal panel constant voltage line HPVL4 may extend in the first direction D1 and may transmit the second panel constant voltage to the second sub-pixel circuit SPC2.

In an embodiment, the fourth horizontal panel constant voltage line HPVL4 may be electrically connected to the fourth vertical panel constant voltage line VPVL4, through the fourth panel constant voltage connecting pattern PVP4. The fourth horizontal panel constant voltage line HPVL4 may receive the second panel constant voltage, through the fourth vertical panel constant voltage line VPVL4 and the fourth panel constant voltage connecting pattern PVP4.

The first horizontal low voltage connecting pattern HSP1 may extend in the first direction D1. In an embodiment, the first horizontal low voltage connecting pattern HSP1 may be connected to at least one of the first to sixth vertical low voltage lines VSL1, VSL2, VSL3, VSL4, VSL5, and VSL6.

The second horizontal low voltage connecting pattern HSP2 may extend in the first direction D1. In an embodiment, the second horizontal low voltage connecting pattern HSP2 may be connected to at least one of the first to sixth vertical low voltage lines VSL1, VSL2, VSL3, VSL4, VSL5, and VSL6.

The third horizontal low voltage connecting pattern HSP3 may extend in the first direction D1. In an embodiment, the third horizontal low voltage connecting pattern HSP3 may be connected to at least one of the seventh and eighth vertical low voltage lines VSL7 and VSL8.

The fourth horizontal low voltage connecting pattern HSP4 may extend in the first direction D1. In an embodiment, the fourth horizontal low voltage connecting pattern HSP4 may be connected to at least one of the seventh and eighth vertical low voltage lines VSL7 and VSL8.

The first vertical low power voltage line VSL1 may extend in the second direction D2. In an embodiment, the first vertical low power voltage line VSL1 may be connected to the first horizontal low power voltage connecting pattern HSP1 and the second horizontal low power voltage connecting pattern HSP2, through a contact hole. The first vertical low power voltage line VSL1 may transmit the low power voltage ELVSS.

The second vertical low power voltage line VSL2 may extend in the second direction D2. In an embodiment, the second vertical low power voltage line VSL2 may be connected to the first horizontal low power voltage connecting pattern HSP1 and the second horizontal low power voltage connecting pattern HSP2, through a contact hole. The second vertical low power voltage line VSL2 may transmit the low power voltage ELVSS.

The first vertical panel constant voltage line VPVL1 may extend in the second direction D2. In an embodiment, the first vertical panel constant voltage line VPVL1 may be electrically connected to the first horizontal panel constant voltage line HPVL1, through the first panel constant voltage connecting pattern PVP1. The first vertical panel constant voltage line VPVL1 may transmit the first panel constant voltage.

The second vertical panel constant voltage line VPVL2 may extend in the second direction D2. In an embodiment, the second vertical panel constant voltage line VPVL2 may be electrically connected to the second horizontal panel constant voltage line HPVL2, through the second panel constant voltage connecting pattern PVP2. The second vertical panel constant voltage line VPVL2 may transmit the second panel constant voltage.

The third vertical low power voltage line VSL3 may extend in the second direction D2. In an embodiment, the third vertical low power voltage line VSL3 may be connected to the first horizontal low power voltage connecting pattern HSP1 and the second horizontal low power voltage connecting pattern HSP2, through a contact hole. The third vertical low power voltage line VSL3 may transmit the low power voltage ELVSS.

The fourth vertical low power voltage line VSL4 may extend in the second direction D2. In an embodiment, the fourth vertical low power voltage line VSL4 may be connected to the first horizontal low power voltage connecting pattern HSP1 and the second horizontal low power voltage connecting pattern HSP2, through a contact hole. The fourth vertical low power voltage line VSL4 may transmit the low power voltage ELVSS.

The fifth vertical low power voltage line VSL5 may extend in the second direction D2. In an embodiment, the fifth vertical low power voltage line VSL5 may be connected to the first horizontal low power voltage connecting pattern HSP1 and the second horizontal low power voltage connecting pattern HSP2, through a contact hole. The fifth vertical low power voltage line VSL1 may transmit the low power voltage ELVSS.

The sixth vertical low power voltage line VSL6 may extend in the second direction D2. In an embodiment, the sixth vertical low power voltage line VSL6 may be connected to the first horizontal low power voltage connecting pattern HSP1 and the second horizontal low power voltage connecting pattern HSP2, through a contact hole. The sixth vertical low power voltage line VSL2 may transmit the low power voltage ELVSS.

The third vertical panel constant voltage line VPVL3 may extend in the second direction D2. In an embodiment, the third vertical panel constant voltage line VPVL3 may be electrically connected to the third horizontal panel constant voltage line HPVL3, through the third panel constant voltage connecting pattern PVP3. The third vertical panel constant voltage line VPVL3 may transmit the first panel constant voltage.

The fourth vertical panel constant voltage line VPVL4 may extend in the second direction D2. In an embodiment, the fourth vertical panel constant voltage line VPVL4 may be electrically connected to the fourth horizontal panel constant voltage line HPVL4, through the fourth panel constant voltage connecting pattern PVP4. The fourth vertical panel constant voltage line VPVL4 may transmit the second panel constant voltage.

The seventh vertical low power voltage line VSL7 may extend in the second direction D2. In an embodiment, the seventh vertical low power voltage line VSL7 may be connected to the third horizontal low power voltage connecting pattern HSP3 and the fourth horizontal low power voltage connecting pattern HSP4, through a contact hole. The seventh vertical low power voltage line VSL1 may transmit the low power voltage ELVSS.

The eighth vertical low power voltage line VSL8 may extend in the second direction D2. In an embodiment, the eighth vertical low power voltage line VSL8 may be connected to the third horizontal low power voltage connecting pattern HSP3 and the fourth horizontal low power voltage connecting pattern HSP4, through a contact hole. The eighth vertical low power voltage line VSL8 may transmit the low power voltage ELVSS.

In an embodiment, the first vertical low voltage line VSL1, the second vertical low voltage line VSL2, the first vertical panel constant voltage line VPVL1, the second vertical panel constant voltage line VPVL2, the third vertical low voltage line VSL3, the fourth vertical low voltage line VSL4, the fifth vertical low voltage line VSL5, the sixth vertical low voltage line VSL6, the third vertical panel constant voltage line VPVL3, the fourth vertical panel constant voltage line VPVL4, the seventh vertical low voltage line VSL7, and the eighth vertical low voltage line VSL8 may be disposed on the same layer and formed together.

In an embodiment, the first vertical low voltage line VSL1, the second vertical low voltage line VSL2, the first vertical panel constant voltage line VPVL1, the second vertical panel constant voltage line VPVL2, the third vertical low voltage line VSL3, the fourth vertical low voltage line VSL4, the fifth vertical low voltage line VSL5, the sixth vertical low voltage line VSL6, the third vertical panel constant voltage line VPVL3, the fourth vertical panel constant voltage line VPVL4, the seventh vertical low voltage line VSL7, and the eighth vertical low voltage line VSL8 may extend in the second direction D2 and be arranged in parallel along the first direction D1.

The display device DD1, DD2, DD3 according to embodiments may be applied to various electronic devices. An electronic device according to an embodiment may include the display device DD1, DD2, DD3 described above, and may further include a module or device having additional functions in addition to the display device DD1, DD2, DD3.

Figure 19:
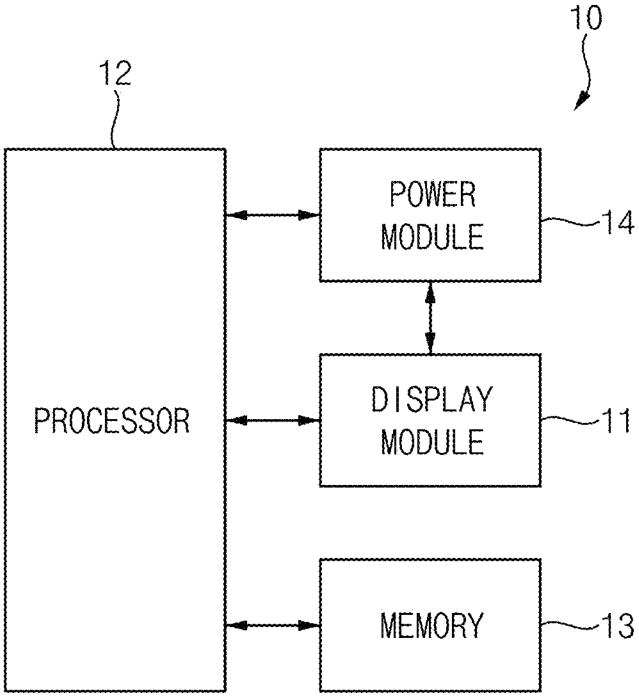
FIG. 19 is a block diagram illustrating an electronic device according to an embodiment of the present disclosure.

FIG. 19 is a block diagram illustrating an electronic device according to an embodiment of the present disclosure.

Referring to FIG. 19, an electronic device 10 may include a display module 11, a processor 12, a memory 13, and a power module 14.

The processor 12 may include at least one of a central processing unit (CPU), an application processor (AP), a graphic processing unit (GPU), a communication processor (CP), an image signal processor (ISP), and a controller.

The memory 13 may store data information necessary for an operation of the processor 12 or the display module 11. When the processor 12 executes an application stored in the memory 13, an image data signal and/or an input control signal may be transmitted to the display module 11, and the display module 11 may process the received signal and output image information through a display screen.

The power module 14 may include a power supply module such as a power adapter, a battery device, or the like and a power conversion module that converts power supplied by the power supply module to generate power necessary for an operation of the electronic device 10.

At least one of the components of the electronic device 10 described above may be included in the display device according to embodiments described above. In addition, some of individual modules functionally included in one module may be included in the display device, and others may be provided separately from the display device. For example, the display device may include the display module 11, and the processor 12, the memory 13, and the power module 14 may be provided in form of other devices in the electronic device 10 other than the display device.

Figure 20:
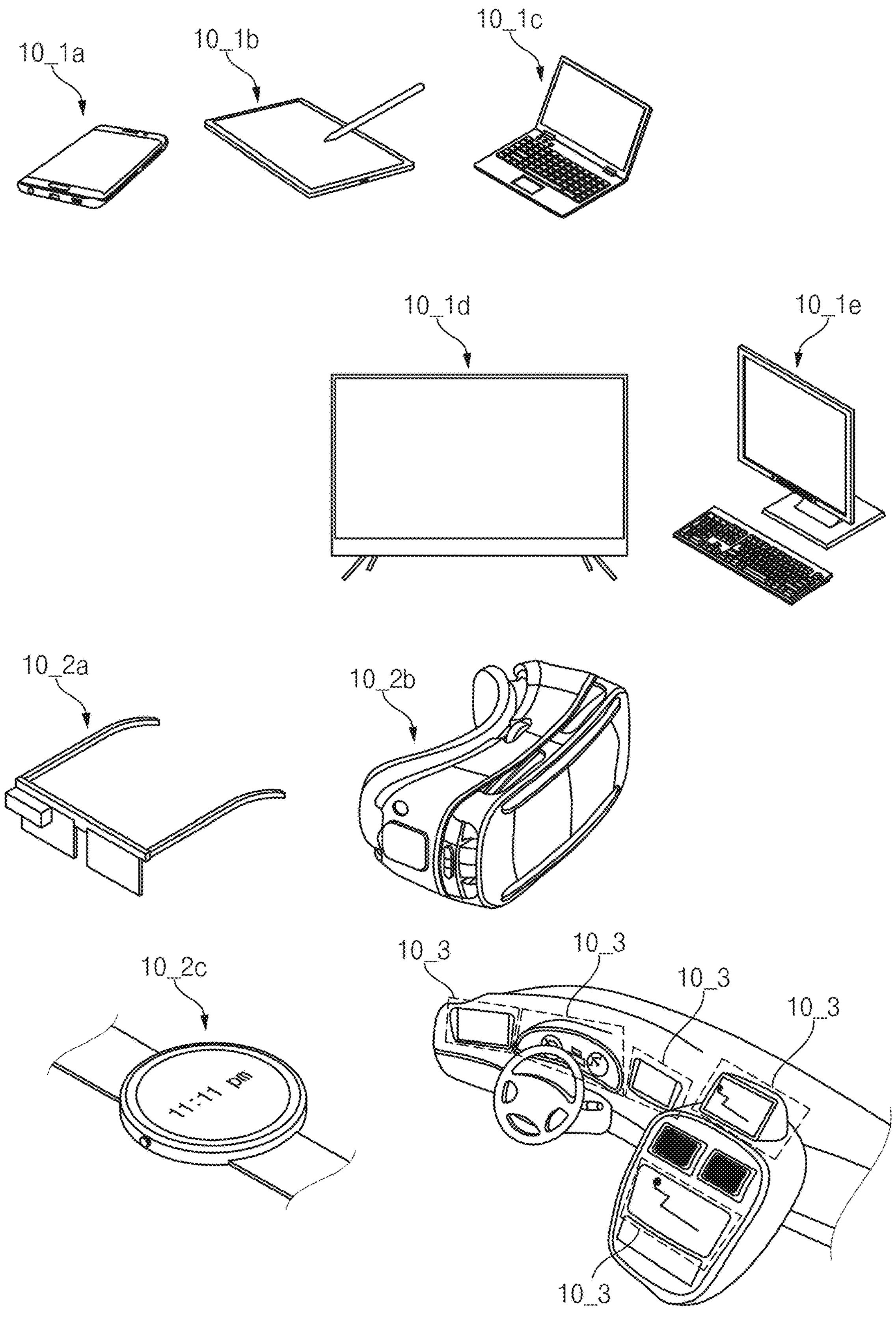
FIG. 20 is a schematic diagram of electronic devices.

FIG. 20 is a schematic diagram of electronic devices.

Referring to FIG. 20, various electronic devices to which the display device according to embodiments are applied may include not only an image display electronic device, but also a wearable electronic device including a display module, a vehicle electronic device 10_3 including a display module, or the like. The image display electronic device may be a smartphone 10_1*a*, a tablet PC 10_1*b*, a laptop 10_1*c*, a TV 10_1*d*, a desk monitor 10_1*e*, or the like. The wearable electronic device may be smart glasses 10_2*a*, a head mounted display 10_2*b*, a smart watch 10_2*c*, or the like. The vehicle electronic device 10_3 may be a center information display (CID) disposed on a dashboard and center fascia of a vehicle, a room mirror display, or the like.

While the present disclosure has been described with reference to embodiments thereof, it will be apparent to those of ordinary skill in the art that various changes and modifications may be made thereto without departing from the sprit and scope of the present disclosure as set forth in the following claims.

What is claimed is:

1. A display device comprising:

sub-pixel circuits disposed on a substrate and arranged in a first direction and a second direction intersecting the first direction;

a horizontal panel constant voltage line disposed on the substrate, extending in the first direction, and transmitting a panel constant voltage to the sub-pixel circuits;

a vertical panel constant voltage line disposed on the horizontal panel constant voltage line, extending in the second direction, and transmitting the panel constant voltage to the horizontal panel constant voltage line;

a vertical bypass data line disposed on a same layer as the vertical panel constant voltage line, extending in the second direction, and transmitting a data voltage to the sub-pixel circuits; and a panel constant connecting pattern disposed between the horizontal panel constant voltage line and the vertical panel constant voltage line, and electrically connecting the horizontal panel constant voltage line and the vertical panel constant voltage line.

2. The display device of claim 1, wherein the vertical panel constant voltage line is disconnected from the vertical bypass data line.

3. The display device of claim 1, wherein the panel constant voltage is transmitted sequentially along the vertical panel constant voltage line, the panel constant voltage connecting pattern, and the horizontal panel constant voltage line.

4. The display device of claim 1, further comprising:

a low power voltage connecting pattern disposed on a same layer as the panel constant voltage connecting pattern; and a vertical low power voltage line disposed on a same layer as the vertical panel constant voltage line, connecting the low power voltage connecting pattern, and transmitting a low power voltage.

5. The display device of claim 4, wherein the vertical low power voltage line extends in the second direction and is arranged parallel to the vertical panel constant voltage line along the first direction.

6. The display device of claim 4, wherein the low power voltage connecting pattern and the panel constant voltage connecting pattern extend in the first direction and are spaced apart from each other along the first direction.

7. The display device of claim 6, wherein the low power voltage connecting pattern is disconnected from the panel constant voltage connecting pattern.

8. The display device of claim 4, wherein the vertical low power voltage line includes a first vertical low power voltage line, a second vertical low power voltage line, and a third vertical low power voltage line, and wherein the first vertical low power voltage line, the vertical panel constant voltage line, the second vertical low power voltage line, and the third vertical low power voltage line are arranged sequentially from a first side to a second side of the display device and are in parallel along the first direction.

9. The display device of claim 8, wherein the low power voltage connecting pattern includes a first low power voltage connecting pattern and a second low power voltage connecting pattern, wherein the first low power voltage connecting pattern is electrically connected to the first vertical low power voltage line, and wherein the second low power voltage connecting pattern is electrically connected to the second vertical low power voltage line and the third vertical low power voltage line.

10. The display device of claim 9, wherein the first low power voltage connecting pattern, the panel constant voltage connecting pattern, and the second low power voltage connecting pattern extend in the first direction and are spaced apart from each other along the first direction.

11. The display device of claim 9, wherein the vertical low power voltage line further includes a fourth vertical low power voltage line, a fifth vertical low power voltage line, and the sixth vertical low power voltage line, wherein the vertical panel constant voltage line includes a first vertical panel constant voltage line and a second vertical panel constant voltage line, and wherein the fourth vertical low power voltage line, the second vertical panel constant voltage line, the fifth vertical low power voltage line, and the sixth vertical low power voltage line are arranged sequentially from the first side to the second side of the display device and are in parallel along the first direction.

12. The display device of claim 11, wherein the panel constant voltage connecting pattern includes a first panel constant voltage connecting pattern and a second panel constant voltage connecting pattern, wherein the first panel constant voltage connecting pattern is electrically connected to the first vertical panel constant voltage line, and wherein the second panel constant voltage connecting pattern is electrically connected to the second vertical panel constant voltage line.

13. The display device of claim 11, wherein the second low power voltage connecting pattern is further electrically connected to the fourth vertical low power voltage line, the fifth vertical low power voltage line, and the sixth vertical low power voltage line.

14. The display device of claim 13, wherein the low power voltage connecting pattern further includes a third low power voltage connecting pattern and a fourth low power voltage connecting pattern, wherein the third low power voltage connecting pattern is electrically connected to the first vertical low power voltage line, the second vertical low power voltage line, the third vertical low power voltage line, and the fourth vertical low power voltage line, and wherein the fourth low power voltage connecting pattern is electrically connected to the fifth vertical low power voltage line and the sixth vertical low power voltage line.

15. The display device of claim 14, wherein the third low power voltage connecting pattern, the second panel constant voltage connecting pattern, and the fourth low power voltage connecting pattern extend in the first direction and are spaced apart from each other along the first direction, and wherein the first panel constant voltage connecting pattern and the second panel constant voltage connecting pattern are spaced apart from each other along the second direction.

16. The display device of claim 4, wherein the vertical low power voltage line includes a first vertical low power voltage line and a second vertical low power voltage line, wherein the vertical panel constant voltage line includes a first vertical panel constant voltage line and a second vertical panel constant voltage line, and wherein the first vertical low power voltage line, the second vertical low power voltage line, the first vertical panel constant voltage line, and the second vertical panel constant voltage line are arranged sequentially from a first side to a second side of the display device and are in parallel along the first direction.

17. The display device of claim 16, wherein the low power voltage connecting pattern includes a first low power voltage connecting pattern and a second low power voltage connecting pattern, wherein the first low power voltage connecting pattern and the second low power voltage connecting pattern are arranged in parallel along the second direction, and are electrically connected to the first and second vertical low power lines, and wherein the panel constant voltage connecting pattern is arranged spaced apart from the second low power voltage connecting pattern along the first direction and is electrically connected to the first and second vertical panel constant voltage lines.

18. The display device of claim 4, wherein the vertical panel constant voltage line includes a first vertical panel constant voltage line and a second vertical panel constant voltage line, wherein the first vertical panel constant voltage line transmits a first panel constant voltage to a first sub-pixel circuit, wherein the second vertical panel constant voltage line transmits a second panel constant voltage different from the first panel constant voltage to a second sub-pixel circuit, and wherein the panel constant voltage is an anode initialization voltage which initializes a pixel electrode.

19. An electronic device comprising:

a display device; and a power supply configured to provide power to the display device, wherein the display device comprises:

sub-pixel circuits disposed on a substrate and arranged in a first direction and a second direction intersecting the first direction;

a horizontal panel constant voltage line disposed on the substrate, extending in the first direction, and transmitting a panel constant voltage to the sub-pixel circuits;

a vertical panel constant voltage line disposed on the horizontal panel constant voltage line, extending in the second direction, and transmitting the panel constant voltage to the horizontal panel constant voltage line;

a vertical bypass data line disposed on a same layer as the vertical panel constant voltage line, extending in the second direction, and transmitting a data voltage to the sub-pixel circuits; and a panel constant connecting pattern disposed between the horizontal panel constant voltage line and the vertical panel constant voltage line, and electrically connecting the horizontal panel constant voltage line and the vertical panel constant voltage line.

* * * * *